(12) United States Patent
Zoldi et al.

(10) Patent No.: US 11,574,234 B2
(45) Date of Patent: Feb. 7, 2023

(54) BLOCKCHAIN FOR DATA AND MODEL GOVERNANCE

(71) Applicant: FAIR ISAAC CORPORATION, Roseville, MN (US)

(72) Inventors: Scott Michael Zoldi, San Diego, CA (US); Shafi Rahman, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 1095 days.

(21) Appl. No.: 16/128,359

(22) Filed: Sep. 11, 2018

(65) Prior Publication Data
US 2020/0082302 A1   Mar. 12, 2020

(51) Int. Cl.
| | | |
|---|---|---|
| G06N 20/00 | (2019.01) | |
| G06F 16/23 | (2019.01) | |
| G06N 5/02 | (2006.01) | |
| H04L 9/06 | (2006.01) | |
| H04L 9/00 | (2022.01) | |

(52) U.S. Cl.
CPC ......... *G06N 20/00* (2019.01); *G06F 16/2379* (2019.01); *G06N 5/02* (2013.01); *H04L 9/0637* (2013.01); *H04L 9/50* (2022.05)

(58) Field of Classification Search
CPC . G06N 99/005; G06F 17/30377; G06Q 10/06
See application file for complete search history.

(56) References Cited

U.S. PATENT DOCUMENTS

| | | | |
|---|---|---|---|
| 8,769,412 B2* | 7/2014 | Gill | G06F 21/577 |
| | | | 709/224 |
| 10,019,677 B2* | 7/2018 | Gill | G06Q 10/067 |

(Continued)

FOREIGN PATENT DOCUMENTS

WO   WO 2019135860   *   7/2019   ............. G06Q 40/02

OTHER PUBLICATIONS

"Hyperledger." Wikipedia. Wikipedia.org, (Aug. 23, 2018). Web. Oct. 14, 2019. pp. 1-5.

(Continued)

*Primary Examiner* — Daniel S Felten
(74) *Attorney, Agent, or Firm* — Mintz, Levin, Cohn, Ferris, Glovsky and Popeo, P.C.; F. Jason Far-hadian, Esq.

(57) ABSTRACT

A model governance framework uses a shared ledger on the back of a blockchain. The solution tracks various analytic tracking documents (ATDs) and associated assets, like requirements and sprints, through various stages of an ATD lifecycle. Data schema and data distributions are also tracked. The decision models, corresponding variables and execution codes are also tracked. Existing variables and execution codes are made available via a preexisting asset ATD for reuse. Various transactions provide mechanism for accessing and manipulating the various assets through a recorded ledger of events and approvals. A system provides tracking of the approvals and the approvers of all model assets that are touched by any participant, and further provides access control and security for multi-user access. An application layer provides graphical access to the various aspects of the blockchain. Event notification provides the backbone for interfacing with various external systems like email servers and version control systems.

20 Claims, 11 Drawing Sheets

(56) References Cited

U.S. PATENT DOCUMENTS

| | | | |
|---|---|---|---|
| 10,021,138 B2* | 7/2018 | Gill | H04L 63/20 |
| 10,282,711 B2* | 5/2019 | Chan | G06Q 30/0214 |
| 2012/0029977 A1* | 2/2012 | Alcorn | G06Q 10/06393 |
| | | | 705/7.39 |
| 2018/0189797 A1* | 7/2018 | Ravi | G06Q 30/018 |
| 2019/0179672 A1* | 6/2019 | Christidis | H04L 9/3239 |
| 2019/0205978 A1* | 7/2019 | Way | G06Q 40/025 |
| 2020/0348641 A1* | 11/2020 | Li | G05B 19/0426 |

OTHER PUBLICATIONS

Gandrud, Christopher. "Reproducible Research with R and RStudio," *Reproducible Research with R and Rstudio*, T&F India. (May 24, 2013). pp. 81-100.

Hauner, Valentin J. "Trustworthy Configuration Management with Distributed Ledgers." Master's Thesis in Informatics, Technical University of Munich, Department of Informatics, May 15, 2018, pp. 1-120. Available at https://www.net.in.tum.de/fileadmin/bibtex/publications/theses/2018_trustworthy_config_management_ma.pdf (last accessed Nov. 6, 2019).

International Search Report and Written Opinion issued in International Application No. PCT/US2019/050463, dated Oct. 24, 2019 (Oct. 24, 2019). 13 pages.

O'Mahoney, Paul and Fenglian Xu. "Create powerful blockchain queries with Hyperledger Composer." *IBM Developer*. (Dec. 31, 2016). Web. Oct. 15, 2019. pp. 1-16.

Swan, Melanie. "Blockchain: Blueprint for a New Economy." *Blockchain: Blueprint for a New Economy*, O'Reilly Media, Inc. (Feb. 8, 2015), Chapters 3 and 4. 149 pages.

* cited by examiner

```
"class": "com.fico.atd.LogEntry",
"editor": "resource:com.fico.atd.Employee#shari@fico.com",
"action": "AddingToSprint: ATD001-S-2",
"notes": "Added new requirement ATD001-R-2 to the sprint ATD001-S-2",
"timestamp": "2018-06-14T22:32:16.120Z"

"class": "com.fico.atd.LogEntry",
"editor": "resource:com.fico.atd.Employee#shari@fico.com",
"action": "AddingToSprint: ATD001-S-2",
"notes": "Added new scientist dave@fico.com to the sprint ATD001-S-2",
"timestamp": "2018-06-14T22:33:25.901Z"

"class": "com.fico.atd.LogEntry",
"editor": "resource:com.fico.atd.Employee#scott@fico.com",
"action": "ApproveSprint: ATD001-S-2",
"notes": "Sprint approved with notes: to show this gets approved",
"timestamp": "2018-06-14T22:34:21.267Z"
```

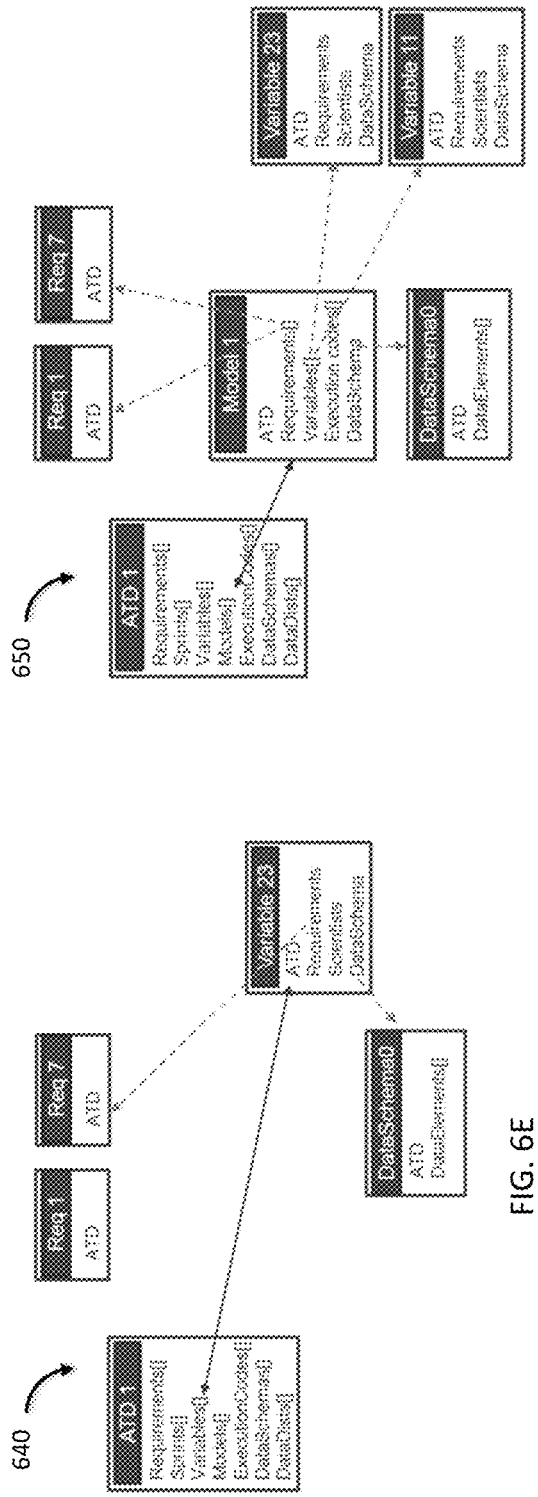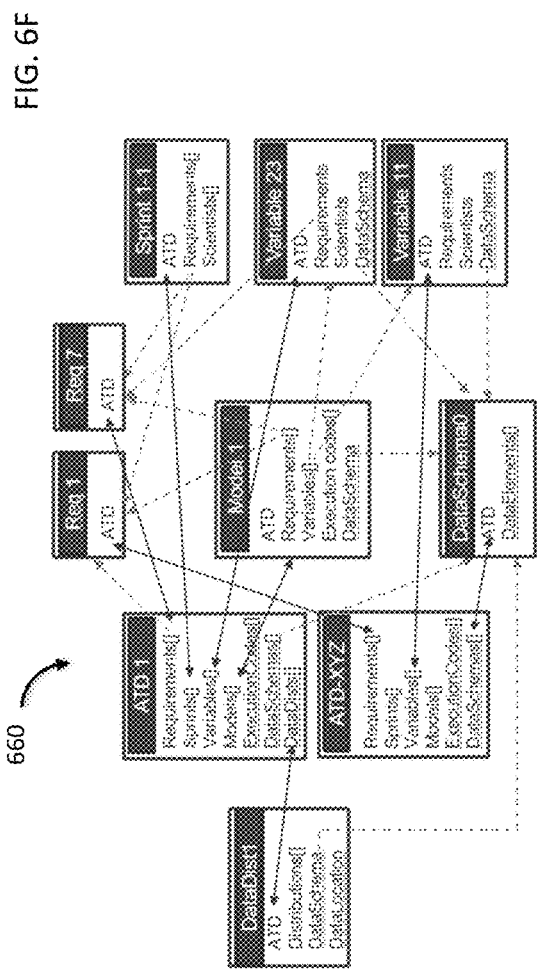

BLOCKCHAIN FOR DATA AND MODEL GOVERNANCE

TECHNICAL FIELD

The subject matter described herein relates to computer-implemented decision models for making decisions, and more particularly to a blockchain for data and model governance.

BACKGROUND

Organizations are increasingly using decision models for making decisions. These decision models comprise of statistical and machine learning based algorithms or even expert knowledge based equations, representing relationships derived from data elements and features/variables derived from the input data to inform one or more decisions or outcomes. Often, there is execution code that goes hand-in-hand with the models. Collectively these data elements, features, models, and decisioning processes significantly influence many outcomes, as they drive decisions pertaining to marketing offers, loan origination, fraud detection, collection strategy, and a variety of other risk and operation functions.

Consequently, these data elements affect key metrics, such as revenue and loss of the organization, or customer impact. Given this critical impact, it is a key imperative for organizations to track the provenance of the decision models deployed for making decisions. Furthermore, accountability for the outcome necessitates tracking of the history of the models, code, and design assumptions, along with the details of various individuals who designed the various components of the model and thus impact its performance.

To make matters even more critical, various laws and regulations govern many organization processes. Consider, for example, the Equal Credit Opportunity Act (ECOA), a United States law, which makes it unlawful for any creditor to discriminate against any applicant based on various protected characteristics. In such a scenario, it is important to build the models to such specifications that can convincingly demonstrate that the model adheres to any relevant laws and regulations. It becomes critical, for example, that one can diligently track who defined and approved the requirements for such a model, approved of utilized data, designed and approved of derived features, and designed and approved the built model. Further, there must be tracking of the testing and formal model governance function of the model review and model testing.

Development of analytic models requires tracking and approvals across the entire model development, testing, governance, and deployment process and such approvals should be immutable such that each atomic design is reviewed as to compliance with the process. This would include any record of approval by the external agency for future reference.

Hitherto, variety of techniques have been employed for tracking decision models used for decisions. They often suffer from a few key challenges, which make them ineffective. Most significant of these limitations is lack of a built-in mechanism for diligently and exhaustively tracking all the aspects of changes and modifications in these systems. Often, organizations do not understand the code behind the models, how features were derived or approved, and/or cannot deploy or maintain these models. Worse, some organizations deploy models without having the appropriate atomic governance of data, features, model design, and production data environment statistics approved and monitored. Equally important is the limitation of many of these systems to guarantee that unauthorized changes cannot be made to any aspect of the information being tracked. Many such systems also suffer from lack of transparency, making their information less reliable. This poses tremendous operational risk to organizations and owners who increasingly run their business on data driven models.

The above limitations might be able to be addressed with a blockchain. The most well-known blockchain, Bitcoin, a cryptocurrency blockchain, is public and allows anyone to participate and access the ledger. The trust, security and consensus in such an open and public blockchain is achieved by masses of independent miners solving expensive cryptographic problems. According to various estimates, achieving consensus in Bitcoin consumes more electricity a year than the country of Ireland. For most industry-level enterprises and businesses, this is wasteful and unnecessary. In such applications, only a limited set of permissioned parties need to participate and have access to the shared ledger. Shared ledger is defined subsequently. In such systems, trust and consensus is dependent on the established relationship between the parties in the real world. Such systems can also limit permissions and access to the participating parties based on their role. These networks have access control layer built into the blockchain nodes. Furthermore, only known nodes are allowed to participate. These ecologically responsible uses of blockchain leverage trust through permissions, roles, and process.

SUMMARY

This document describes various solutions to the issues described above, while ensuring effective model governance. The solutions are based on the concept of a shared ledger, more specifically a blockchain, distributed across multiple nodes, which is leveraged to track end-to-end provenance of a decision model in an immutable manner. A permissioned blockchain can be used, as opposed to the public systems that power cryptocurrencies or other open blockchain solutions. The solution described herein, and the underlying methodology, provide transparency of information while breaking down "silos" between various departments tasked with managing various aspects of a decision model. Due to the design of a blockchain, bolstered by the design of the solution described herein, making an unauthorized change in the information is practically impossible. Furthermore, going beyond in inherent immutable property of a blockchain, the solution described herein is designed in a manner that any authorized changes need to be approved by identified approvers with ability to approve or roll back changes.

Accordingly, a model governance framework and a corresponding solution to implement it using shared ledger on the back of a blockchain has been developed. The solution tracks various assets like analytic tracking documents (ATDs) and requirements, and "sprints" of the ATDs through various stages of an ATD lifecycle. The decision models, corresponding variables and execution codes are also tracked. Existing variables and execution codes are made available via a Preexisting Asset ATD for reuse. In a blockchain, an asset is a virtual representation of an object of value that is recorded and tracked in the shared ledger.

An important aspect is the tracking of the approvals and the approvers of all assets that are touched by any participant. Access control is provided in any of a number of ways, as described herein. Most security aspects of the model governance blockchain is due to the distributed and shared nature of the blockchain. Additional security is provided using a multi-user access via identity creation and management of all participants. An application layer provides graphical access to the various aspects of the blockchain. The references to various assets allow a consistent look and feel of the application. Historian, LogEntries and Queries, described herein, provide access to additional information pertaining to provenance and history of various assets.

In some variations one or more of the following features can optionally be included in any feasible combination. The defining an analytical model may include requirements, sprints, data, models, variables and execution codes of the analytic model. Each of the one or more blocks of the blockchain may include a timestamp and transaction data related to at least a portion of the at least one ATD. The methods and operations included herein may include storing the one or more blocks of the blockchain and associated code assets in a version control code database. A block may represent the at least one ATD represents a state in a lifecycle of an analytic module comprising one or more of requirements, sprints, models, variables and execution codes. Each requirement, data source, variable, execution code, and model associated with the ATD in the blockchain may be associated with one or more required approvers. The model development and deployment blockchain can be queried to document formal approvals and timestamps of the approvers in the block chain associated with the data source, variable, execution code, and model for use in model governance, validation, and regulatory processes.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a shared blockchain ledger, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 shows a partial snapshot of an array of a LogEntry as part of an ATD asset in JSON format on Hyperledger fabric;

FIGS. 6A-6G illustrate architectures and relationships of ATD assets with other related assets;

When practical, similar reference numbers denote similar structures, features, or elements.

DETAILED DESCRIPTION

This document a system and method for effective model governance, which is based on a distributed ledger, such as a blockchain, and which is leveraged to track end-to-end provenance of a decision model in an immutable manner. In some implementations, a permissioned blockchain is used. Use of a blockchain provides transparency of information while breaking down silos between various departments tasked with managing various aspects of a decision model. Using a blockchain makes an unauthorized change in the information practically impossible. Furthermore, in the system described herein, any authorized changes need to be approved by identified approvers with an ability to approve or roll back changes.

Figure 1:
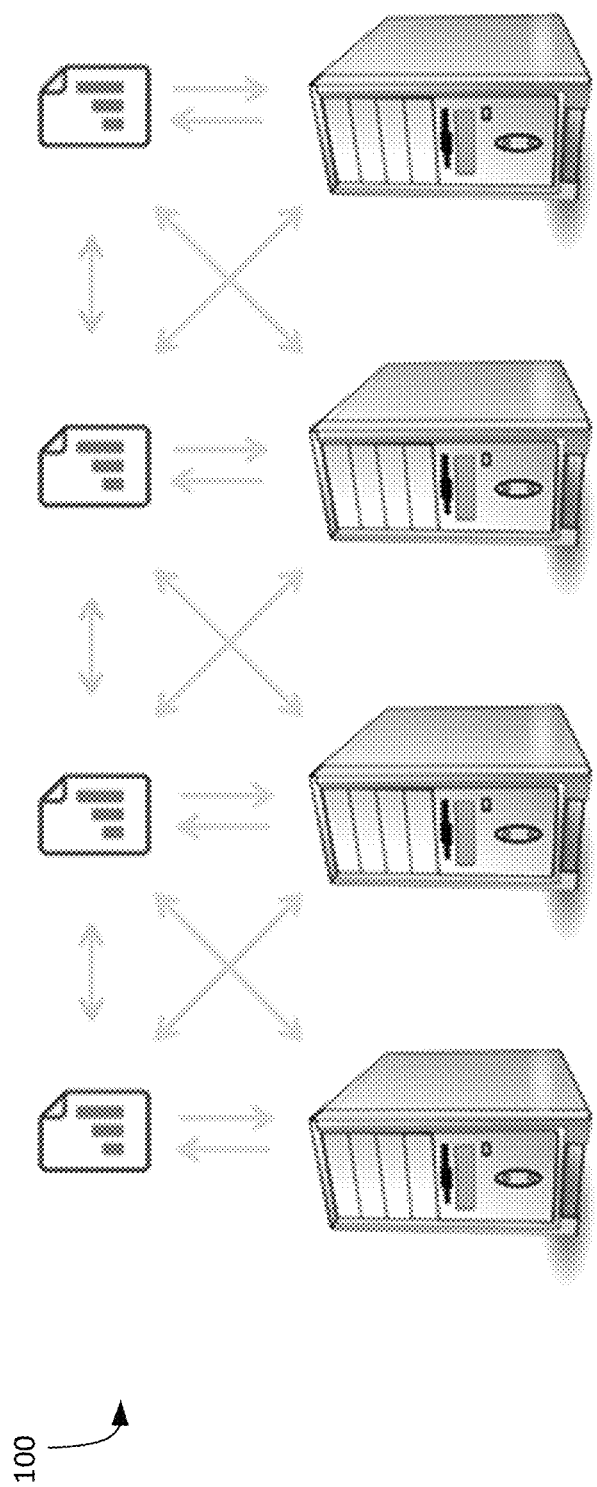
FIG. 1 is schematic representation of a distributed ledger replicated and implemented on multiple nodes, which are synchronized using a peer-to-peer network.

In accordance with implementations described herein, a distributed ledger, also called a shared ledger, is a decentralized database that is held and updated independently by each node in a large network. In such a system, digital data resides with all permitted parties, which data is replicated, shared, and synchronized on multiple nodes. A peer-to-peer network ensures replication across nodes and a consensus algorithm ensures validation of new information. Such a distributed ledger provides transparency of information for the permitted parties, while eliminating duplication of effort in maintaining the information due to a single source of truth replicated across multiple nodes. FIG. 1 is a schematic representation 100 of a distributed ledger replicated and implemented on multiple nodes which are synchronized using a peer-to-peer network.

Figure 2:
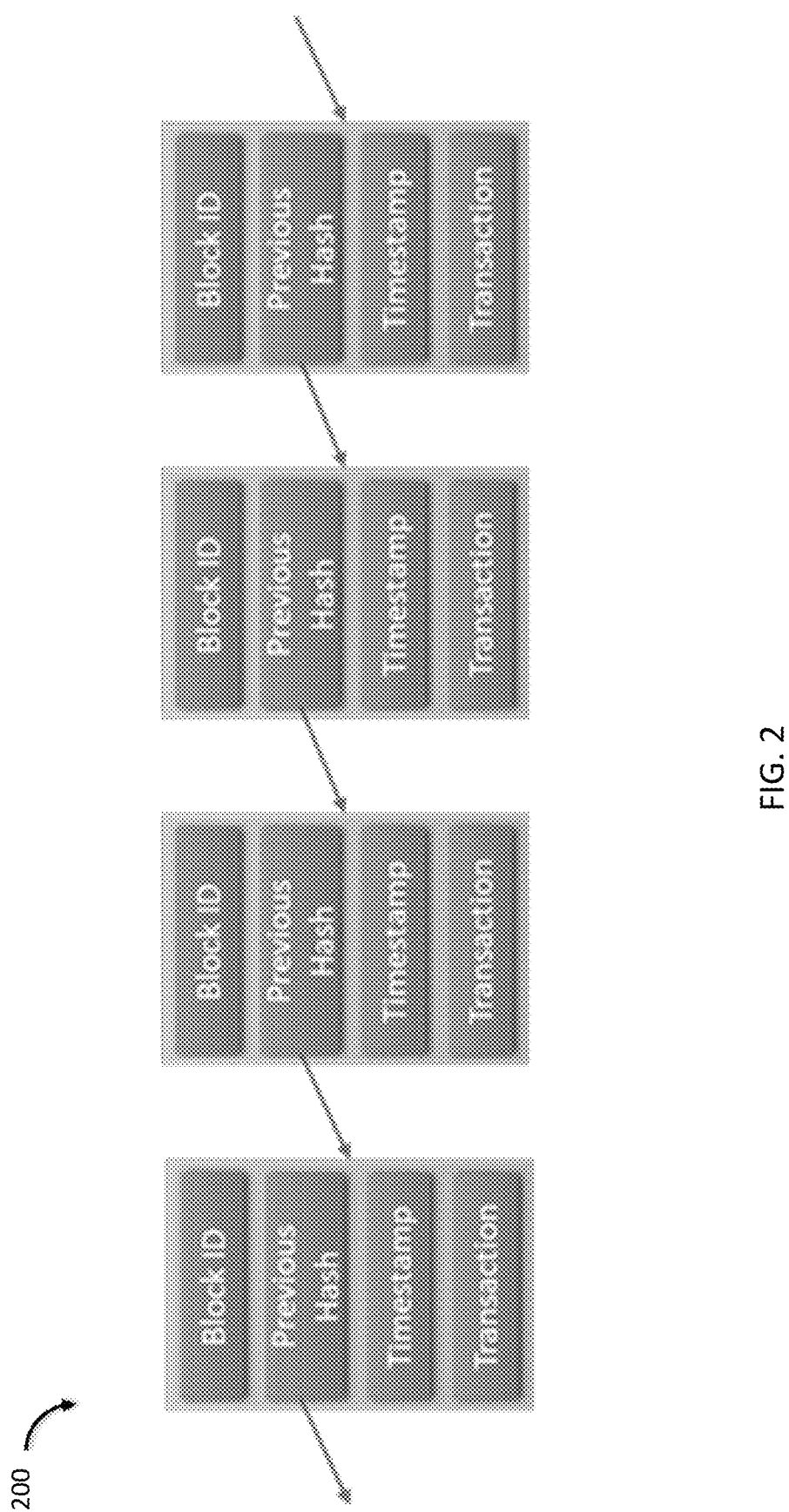
FIG. 2 is a schematic of a section of a blockchain showing each transaction being recorded as part of a block and chained together using a sequence of blocks.

One form of distributed ledger design is a blockchain system, which employs a chain of blocks to provide security of the information. Blocks are a continuously growing list of records, which are linked using cryptography or similar methods. Each block typically contains a cryptographic hash of the previous block to provide security, along with a timestamp and the transaction data. This linkage ensures that each transaction is recorded in manner that creates an audit trail. Once recorded, the data in any given block cannot be altered without invalidating the cryptographic hash of all the subsequent blocks. This makes a blockchain resistant to tampering of the recorded transaction data, as all copies would need to be manipulated. FIG. 2 is a schematic 200 of a section of a blockchain showing each transaction being recorded as part of a block and chained together using a sequence of blocks. This provides an effective mechanism for monitoring all transactions.

Distributed ledgers such as a blockchain also make it possible to automatically execute contracts, known as Smart Contracts. Thus, apart from the asset being tracked by the distributed ledger on a blockchain, it also has programs that can run code. Code validates conditions and, when specified conditions are met, it can automatically make changes to the assets, where these changes are also tracked automatically along with the code that made the changes.

Model Governance Network

For model governance, we have defined and implemented a blockchain network with various types of assets, participants and transactions. Assets are the data structures that capture the information pertaining to the decision models and all the related artefacts that need to be tracked. Participants are the members of the model governance network who can work with these assets. Transactions are the logic that allow participants to work with the assets on this network. The assets, participants and transactions are more fully described below.

The model governance network tracks each action taken with respect to a decision model or other related assets, and leverages a shared ledger that is implemented on a blockchain along with smart contracts for defining the logic associated with various actions or transactions. This blockchain is private and permissioned, with access control enabled to ensure only authorized participants can access and impact the decision model and related assets. In addition, the blockchain can contain or reference one or more secure code segments, such that actual code and data associated with a distribution of critical data elements, for example, are maintained to the chain, where in typical model development processes may be ignored or deleted in the course of model development and deployment. Due to this nature, such a blockchain has a simpler consensus mechanism unlike a public blockchain that resorts to expensive proof of work or other consensus mechanism to establish trust. In some implementations, a model governance network as described herein can be implemented on any blockchain system that meets these properties. In a preferred implementation, Hyperledger Fabric, an open source software, is used for the permissioned blockchain infrastructure, as an example. In all the implementations, assets are stored in a specialized ledger or registry, called an "asset registry," where participants are stored in a specialized ledger or registry called a "participant registry," and all transactions are tracked in a specialized registry as well.

Participants of a Model Governance Network

Participants of the model governance network are individuals who are key players in the life cycle of a model development through to deployment, and hence, need to be represented in the model governance network. These include, but are not limited to: data providers, whether internal or external; analysts who prepare the modeling data; scientists who develop the model; modeling managers who manage the development of the model; program managers who manage various aspects of internal or client facing development projects; a project owner who signs off on all the requirements and approves the model; a model governance owner who is responsible for ensuring all decision models meet internal and the regulatory requirements; model integrators, who integrate the decision models with the production system; and finally external regulators who are tasked by various governing bodies to ensure that the decision models deployed by an enterprise meet relevant regulation.

Note that all participants are persons who have some common characteristics, such as, for instance, first and last names. They also can have an identifier to uniquely identify them, such as an email identifier (ID) or alternatively a single sign-on access login name. These participants are either directly or indirectly on the payroll of the enterprise or the organization using the model governance network, or they are external participants who have a role to play with respect to the development of the decision models and as such are given access to the model governance network. As such, we define and categorize two types of persons. In accordance with implementations described herein, these individuals can be designated either as an employee or an external participant.

In accordance with implementations described herein, there can be multiple types of external participants. For example, a regulator is an outsider who is given access to the model governance network to review and approve all aspects of a decision model and related artefacts. Similarly, in some implementations, an external data provider is either an individual from a third-party vendor, or from the client's organization, whose role is to provide the data necessary for the development of the decision model. Other types of external participants are possible and are defined in alternative implementations.

Employees are categorized into two distinct groups: development and governance. This is done to create a gap between those responsible for developing the model, and those who are responsible for ensuring that all decision models meet internal and the regulatory requirements. A hierarchy can be defined corresponding to an employee, whether responsible for development or for governance. The hierarchy defines the formal job band, and is custom to a particular organization using the governance blockchain. The various levels in the hierarchy is defined as an enumeration data type. An enumeration is a data type that can only take one of the multiple pre-defined values or levels.

Employees responsible for decision model development can be further distinguished based on their role that captures the nature of job function in the context of developing and approving a decision model. The employee role for each "development employee" further categorizes them roles such as a data provider, data analyst, scientist, model integrator, modeling manager, program manager, or project owner. This is done by way of defining an enumeration for the property "role" of the employee.

Figure 3:
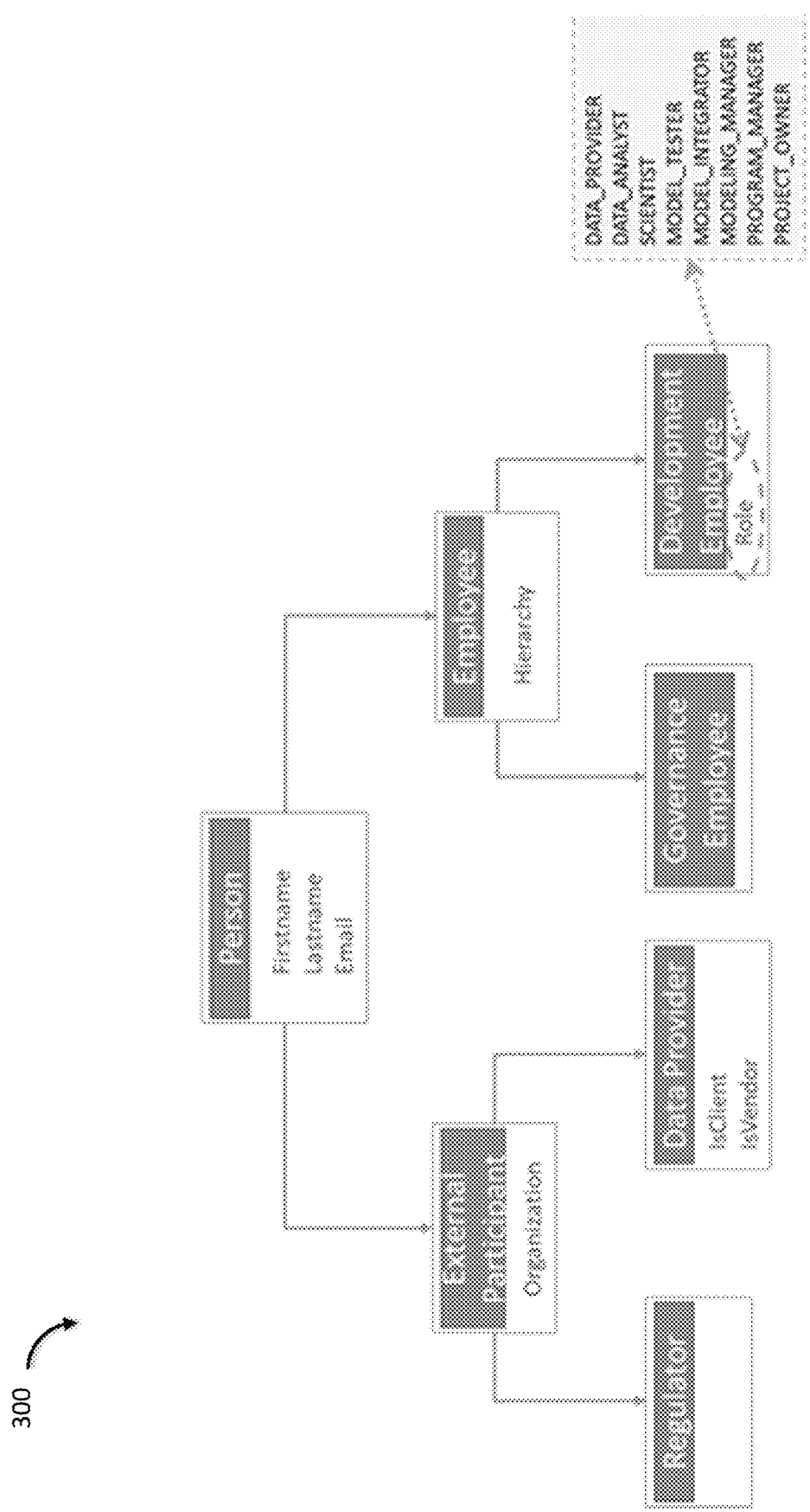
FIG. 3 is a schematic illustration of various types of participants in the model governance network and the relationships among them in one particular implementation.

FIG. 3 is a schematic illustration 300 of the various types of participants in the model governance network and the relationships among them in one particular implementation. Solid arrows represent inheritance or a parent-child relationship, and dotted, double-headed arrows represent an enumeration for the marked property of the asset. Hierarchy property can custom enumeration defined specific to the organization using the governance blockchain. This approach of defining the participants makes it easy to extend or add new types of participants, as well as create "air" gaps between key types of participants.

In accordance with preferred exemplary implementations, a person is defined as an abstract participant such that it cannot be instantiated. Both an external participant and employee are abstract participants which inherit properties of person. These abstract participants inherit properties of the person and add their unique characteristics. A regulator and a data provider inherit properties of an external participant, and a "governance employee" and a "development employee" inherit properties of an employee. In a subsequent section titled "User access and access control", the different ways in which one can limit what each participant type can do, as well as, what each development employee with different employee role can do, is discussed. Furthermore, as discussed in subsequent sections, this allows an ability to enquire the blockchain based on role or hierarchy, or both, of the development employees accessing and modifying assets. The scheme described herein, while comprehensive from the perspective of model governance network, does not preclude additional types of participants from being implemented. There is no restriction on the number and type of levels that can be defined for such development employees. Neither is there a restriction on additional types of persons that can be defined. In some other implementations, we may choose to define other properties of persons, or different categorizations of persons.

User Access and Access Control

Multi-layered mechanisms are provided for access control. First, the access control mechanism of the underlying permissioned blockchain on which the model governance blockchain is built is used and leveraged. For example, a model governance blockchain using Hyperledger Fabric uses business network cards, which contains all the required information needed to connect to the model governance blockchain for a single participant. Using multiple business network cards, one for each participant, allows access to each of the participant. The business network cards are stored in a digital wallet. This is discussed further herein.

A more fine-grained access to various assets in the governance blockchain is defined using an access control list, or ACL. Assets of various types are discussed in the section titled "Assets". Using an ACL, permissions of various types of participants can be defined. This includes a definition of which assets various types of participants can access and their level of access. For instance, in one or more implementations, a regulator's access to the deployables only can be limited, without access to the ATDs, requirements and sprints. Similarly, in another implementation, the external data provider is limited to access only data schema assets. While submitting a transaction to access, view or modify an asset, the transaction must be signed using a certificate corresponding to the participant to say which identity is being used to submit the transaction.

A second level of access control comes from the way the transactions are defined. As described in previous sections pertaining to various types of transactions, a type of participant, and/or employee role in case of development employee, is checked. If the type of participant or the employee role is appropriate, then only the transaction's relevant logic is executed, otherwise the transaction returns without making any changes to the corresponding asset. For instance, ATD transaction can be approved, described in a subsequent section, and the employee role of the user is checked, only if it is project owner, and the status changes to APPROVED. Note that a development employee might be a developer on one project and an approver on another. Furthermore, the approval status can be defined to be time-bound and set to expire on a certain date.

Thus, the technique defined in a previous section and illustrated in FIG. 3 allows for programmatically verifying whether a development employee is the right participant and has elevated levels of access, at that point of time, for a specific asset. For example, a scientist might be the approver for a specific ATD or even a sprint, but may not have the elevated permissions associated with an approver for other ATDs or sprints. This provides the kind of versatility and flexibility that is often encountered in decision model development while allowing for fine grained control required to limit access that is not possible using ACL. ATD and sprint assets are more fully described herein.

Historian, Log Entries and Tracking Digital Elements

As discussed earlier, a blockchain network diligently captures each and every transaction associated with the digital assets that it is designed to track. Blockchain infrastructures have a specialized registry, called a "Historian" in some blockchain systems, which records successful transactions, including participants that submitted those transactions. Information being tracked includes the transaction being invoked successfully, a participant invoking the transaction, a time stamp, inputs to the transaction, and any event that might have been resulted as a consequence of the successful transaction. The Historian provides a global view of all the transactions ever successfully executed in the blockchain network. For instance, in the Hyperledger Fabric™, a blockchain infrastructure, queries to directly access the Historian for specific information about provenance of assets can be defined. Queries are more fully described in the section titled "Queries".

Additionally, a data structure called LogEntry is defined in our implementations, to access an asset's provenance in a more direct manner. An array of LogEntries is defined as an attribute of any asset that needs to be tracked. A LogEntry is defined to capture information related to a transaction that affects that specific asset that the LogEntry array is part of. Among other information, it can be set up to record the participant invoking a transaction that affects that particular asset, a string capturing the action or transaction that was invoked, along with time stamp and any participant supplied notes as part of invoking the transaction. Whenever a transaction is invoked that directly or indirectly impacts a particular asset, logic can be embedded in that transaction to ensure that the corresponding LogEntry array is appended to reflect the tracking information. This provides a fast and efficient manner to look at all the transactions that have affected a particular asset.

In one implementation, the LogEntry tracks only basic information, such as who invoked the transaction, and which transaction was invoked, along with a timestamp and user notes. The user notes can be implicitly and programmatically designed to capture the information being changed. In another implementation, more specific details of the changes are also recorded. This includes a before-and-after value of one or more properties of the asset that the invoked transaction affects. For instance, if the transaction changes the status of an ATD, then before-and-after values reflect the earlier and newly updated statuses. Similarly, if a variable definition is changed, then before and after values reflect the earlier and updated version numbers in the version control repository. Variable assets are more fully described in the section titled "Variables." In implementations where the code of a variable asset is recorded within the variable instance, the before-and-after values reflect the old and new codes. As is described herein, the implementation tracking the code in an external version control repository is a more efficient implementation.

FIG. 4 shows a partial snapshot 400 of an array of a LogEntry as part of an ATD asset (which is more fully described in the next section) represented in JSON format. As shown in FIG. 4, three transactions are recorded for a particular ATD asset. The first transaction adds a requirement to the sprint. This information is also recorded in the LogEntry of the corresponding specific requirement and sprint the requirement is associated. The second transaction adds a scientist to a sprint. The third transaction pertains to the approval of that requirement being incorporated in the sprint by a project owner or governance owner. These two transactions are also recorded in the LogEntry of the sprint. These assets and the transactions discussed here are more fully discussed in the next sections.

FIG. 4 is a partial snapshot of an array of LogEntries as part of an ATD asset in JSON format on the Hyperledger Fabric. In this example, the before-and-after values may be recorded programmatically in the "notes" property. In an alternative implementation, the LogEntry has explicit properties, "before" and "after," which record the before-and-after values of the asset property being modified. Note that the specific data being modified are recorded as the current state of the asset being modified. Also note that another way to access the same information is by querying the historian.

Assets

As discussed earlier, assets are the virtual representation of any physical object of value. A blockchain is specifically configured to keep track of various assets. In the context of model governance, a variety of assets are tracked, and are described below. Often assets are defined using a programming language specifically developed for this purpose. For instance, in the blockchain infrastructure Hyperledger Fabric, assets are defined using CTO modelling language. Hyperledger Composer includes an object-oriented modeling language that is used to define the domain model for a business network definition. CTO is an object-oriented modeling language that is used in Hyperledger Fabric to define the domain model for a business network definition. The domain model describes the various resources including assets, transactions, participants, and events that are discussed in this and subsequent sections.

While blockchains are designed to track transactions, they also maintain a global current state of all the assets. Each asset type has its own registry for maintaining the instances of the assets. In the solution described herein, all instances of assets must be created through a corresponding "create" transaction that, among other things, determines the privileges of the participants explicitly before creating the corresponding asset. Among other things, these create transactions also imprint the details of the transaction in the LogEntry of the newly created assets. For example, a new requirement may be created using a createRequirement transaction to specify that the model must demonstrate a 30% improvement in VDR at a 10:1 false positive ratio. This requirement would then be added to an existing ATD, that would have been created by a createATD transaction. Thus the LogEntry of both the requirement and the ATD assets would record this information, following one of the protocols described in the section titled "Historian, log entries and tracking digital assets." These and other assets are described below.

Analytic Tracking Documents

In accordance with preferred exemplary implementations, the ATD is the primary asset at the core of tracking decision models and related artefacts. An ATD is a digital asset that captures each and every aspect of a decision model and related artefacts. The ATD captures all the relevant information pertaining to the definition of an analytic project, requirements associated with the project, data schemas defining the datasets on which to build on, analytic research and development work that is carried out as part of the project, and all approvals pertaining to the decision model or related artefacts that get created or modified as an outcome of the analytic project. An ATD asset is identified by a unique identifier, and has a timestamp to memorialize the date and time of creation.

As described more fully herein, decision models and related artefacts are grouped together comprehensively under the umbrella of an abstract asset type called a "Deployable." At least three types of deployables can be defined: decision models; variables; and execution codes. An ATD leads to creation of one or more of these deployables that conform to the data schemas specified in the ATD.

An ATD begins its development with a participant, often a modeling manager or a program manager, called a "creator," defining a set of requirements, which are more fully described below. These requirements are either approved by the project owner, or sent back for revisions. Both creator and owner are participants of the type "development employee" with their roles specified as in the section titled "Participants of the model governance network". In almost all cases, an ATD requires that a dataset be procured from either an external provider or an internal data provider. A data analyst may analyze the data before it can be used for creation of any deployable. Thus, these may themselves be requirements of the ATD. It may not be uncommon to define a separate ATD just for data procurement and preparation, and another separate ATD just for the creation of the deployables off the procured datasets. One or more scientists may work on the creation of the deployables.

Once requirements have been approved, a project manager, a program manager or another authorized participant can define a sprint, which includes some of the approved requirements, as more fully described below. Once a sprint is approved and completed, it leads to either procurement and analysis of the data, or creation of one or more deployables. In some instances, a sprint may lead to the creation and verification of a new data schema as well. Data related requirements can be completed in a separate first sprint, before other sprints pertaining to creation of one or more deployables can be executed. An ATD often defines multiple sprints, each comprised of some of the requirements and requiring approvals for successful completion of the sprint. Once all the requirements have been successfully met using one or more sprints, the corresponding deployables, which are the work output of the ATD, are approved by the project owner.

Once the project owner approves the ATD, the work output of the ATD are submitted to the governance team for review and approval. The employee from the governance team may review the work output, often a finished model, or its various components. The components include variable definitions, model architecture, test data, values or ranges of the data elements and so on. A governance manager may request additional requirements or approve the work output so that it can be submitted for review and approval by the external regulator. A regulator may follow a process very similar to the one followed by the governance manager. Such regulator may either approve the deployables as meeting the regulatory requirements, or send back for changes which would spawn additional requirements of the existing ATD or a completely new ATD.

Figure 5:
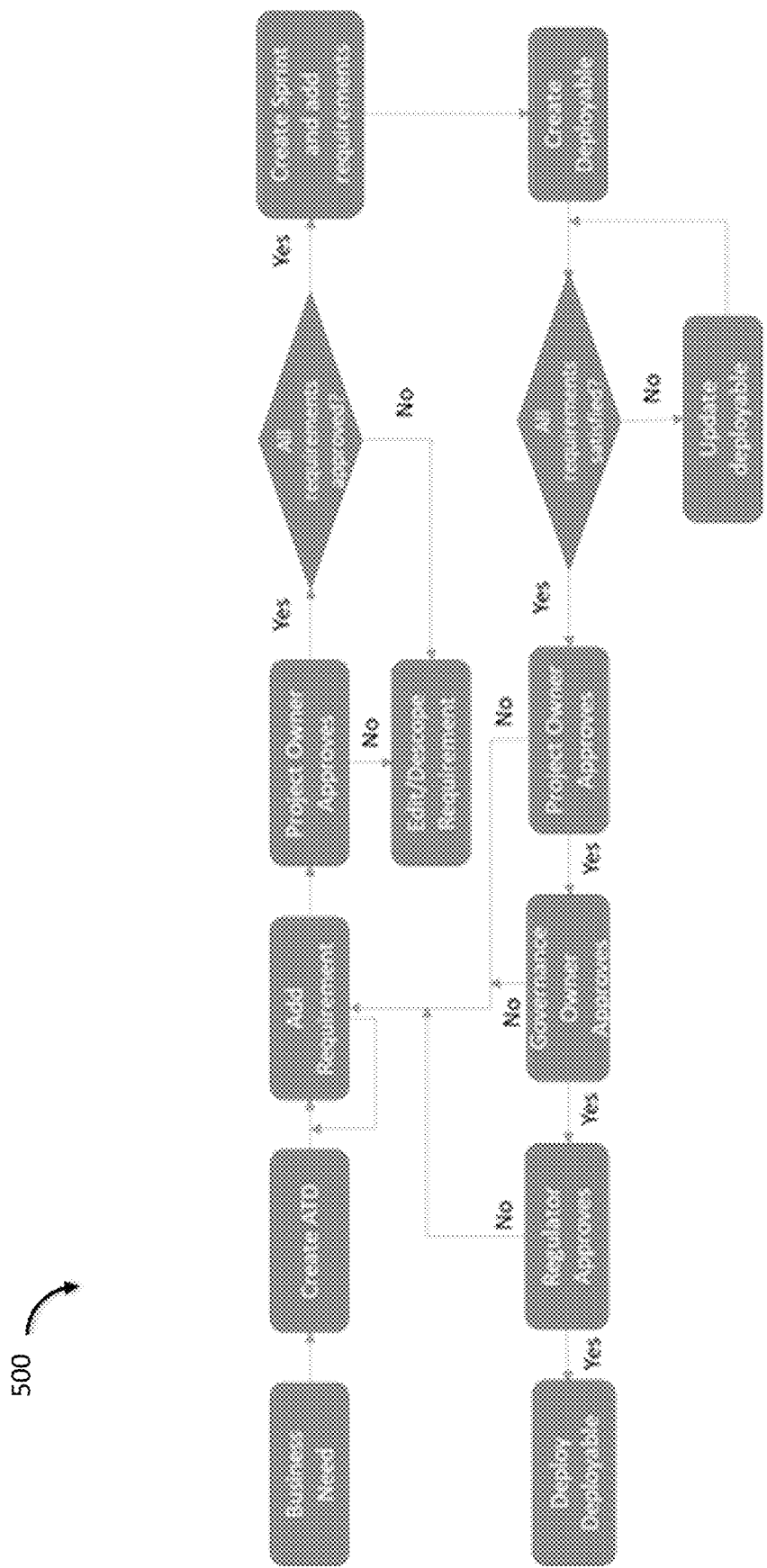
FIG. 5 is a simplified flowchart of an ATD workflow.

FIG. 5 shows an example of a simplified version 500 of this workflow. At every step of this workflow, as participants interact with the ATD using various defined transactions, the LogEntry array corresponding to the ATD is updated to record that action. The actual workflow can have many more steps and decision points that what's shown in this example.

An ATD asset is designed to track all the requirements and sprints associated with it, which are also assets. It tracks the specification of various input data elements as a data schema and records the statistical distributions of the data elements of an input dataset as a data distribution. This dataset is used for the development of the deployables that are created as a consequence of the requirements associated with the ATD and must conform to a data schema associated with the ATD. A data schema is an asset in its own right. Similarly, a data distribution is an asset specific to a dataset conforming to the given data schema. Thus, a single data schema asset can be basis of multiple data distribution assets, each based on specific dataset used to create one or more deployables. An ATD also tracks all deployables as output of one or more of the sprints associated with the ATD. The deployable could be one or more of a decision model, a variable and an execution code, which are assets in their own rights. These assets are more fully described in the next sections. Each of these assets are associated with the ATD using an array each. The array could either be implemented to keep a list of corresponding identifiers or to keep a list of references to the corresponding assets.

For example, to develop a standardized fraud detection model, customized to a particular bank's historical data, an ATD can be created. This ATD would reference a single standard data schema asset that the bank's historical dataset, to be used for the model development, must conform to. A bank-specific data distribution asset can be developed to capture the statistics of the bank's historical dataset. The ATD would also specify a list of requirements, some standard and some specific to the bank. These requirements would be accomplished using one or more sprints. The ATD would keep track of the model being developed as well as any other variable or code that needs to be generated or modified as part of the requirements.

The status of the ATD is tracked using a property called ATDStatus. This can take one of the multiple values defined using an enumeration. For instance, the various statuses that the ATD could be assigned include "CREATED", "MODIFIED" and "APPROVED".

As discussed herein, each ATD also has an array of LogEntries. This tracks any transaction directly related to the ATD, or related to any of the assets that the ATD is directly associated with and tracked in one of the multiple asset arrays. FIGS. 6A-G demonstrate the architecture and relationship of an ATD asset with the rest of the assets.

Figure 6A:
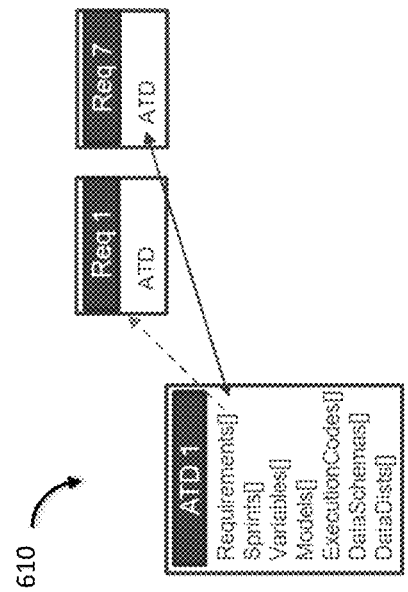

FIG. 6A shows a diagram 600 of a Preexisting Asset ATD, ATD-XYZ, references a pre-existing variable asset, Variable-11, data schema, DataSchema0 and requirement Req-1. The ATD-XYZ holds a reference to them and vice versa. Preexisting Asset ATD is discussed below and is a catch-all ATD to reference all pre-existing assets prior to the point of time the usage of the governance blockchain began.

Figure 6B:
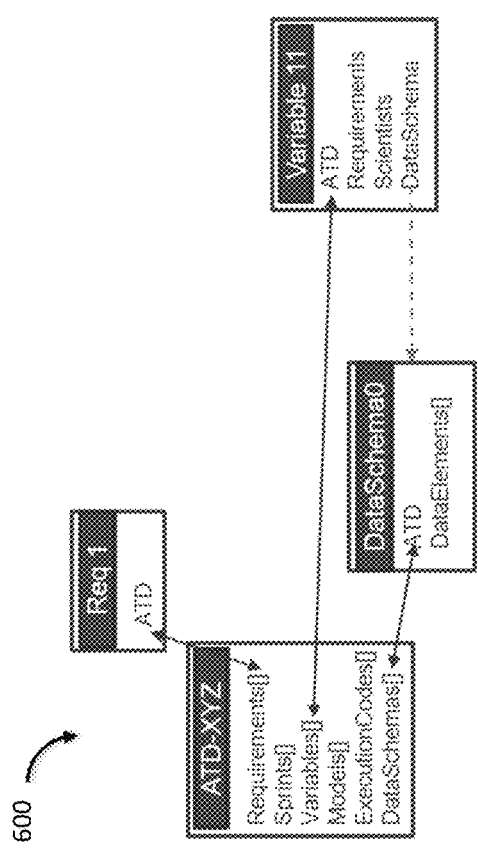

FIG. 6B shows a diagram 610 of a new ATD, ATD-1, which is created with two requirement assets, Req-1 and Req-7. The ATD-1 holds reference to both the requirements. Only Req-7 holds reference to ATD-1 as it is a newly created requirement. Req-1 is a pre-existing requirement and holds reference to ATD-XYZ as shown in FIG. 6B.

Figure 6C:
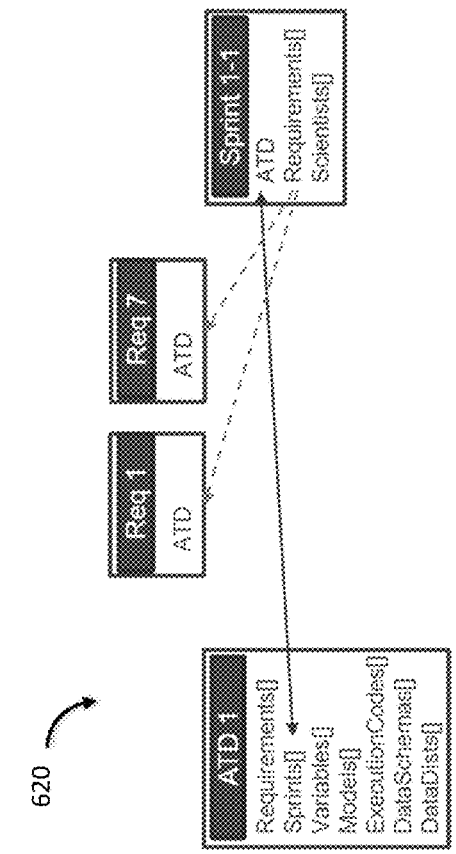

FIG. 6C shows a diagram 620 of a new sprint asset, Sprint-1-1 associated with the ATD-1 to accomplish the two requirements, Req-1 and Req-7, associated with the ATD-1. The ATD-1 holds a reference to the Sprint-1-1 and the Sprint-1-1 holds reference to the ATD-1 as well as to the two requirements.

Figure 6D:
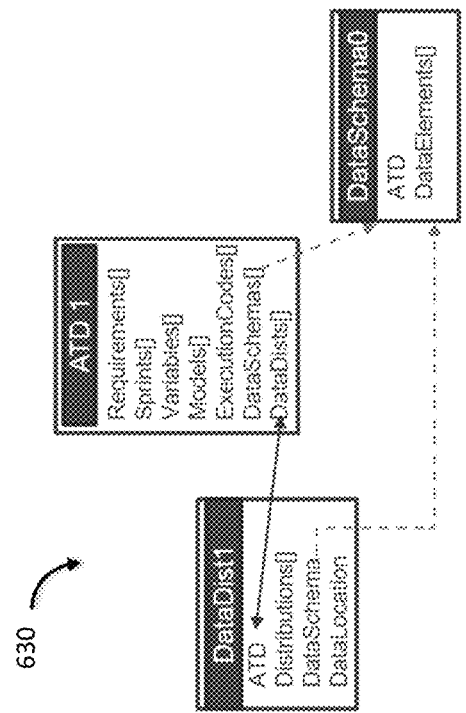

FIG. 6D shows a diagram 630 of where ATD-1 holds reference to DataSchema0. It also holds reference to Data-Dist1 and vice versa. DataDist1 is built on top of DataSchema0 and holds statistical distributions of data elements corresponding to the dataset located at DataLocation. Data distribution asset, DataDist-1, is created to represent the statistics of the dataset at DataLocation, based on the format described by DataSchema-0. A single data schema asset can be basis for multiple data distribution assets, spanning across multiple ATDs.

FIG. 6E shows a diagram 640 of a new variable, Variable-23, that has been created to satisfy the requirement Req-7 associated with the ATD-1. The ATD-1 holds the reference to the new Variable-23 and the variable holds the reference to the ATD-1 as well as the Req-7 that led to its creation. It also references DataSchema0 that it is based on.

FIG. 6F shows a diagram 650 of a Model-1 created to satisfy requirements Req-1 and Req-7. It uses the Variable-23 and the pre-existing Variable-11 and refers to DataSchema0. ATD-1 holds a reference to this model and vice versa.

FIG. 6G illustrates a global view 660 of the asset registries at a snapshot of time. It shows assets discussed in FIGS. 6A-F along with their relationships among each other. Two-headed arrows represents a circular reference. A one-headed dotted line arrow references the pointed asset. Note that Req-1, Variable-11 and a pre-existing data schema asset, DataSchema-0 referenced in the ATD-XYZ are used in ATD-1 to meet some of the requirements. Data distribution asset, DataDist-1, is created to represent the statistics of the dataset based on the format described by DataSchema-0. A single data schema asset can be basis for multiple data distribution assets, spanning across multiple ATDs.

It is worth noting that when an asset is created in course of working on an ATD, whether a data schema, a data distribution, a requirement, a sprint, a variable, an execution code, or a model, it creates a reference to it and in return these assets also refer back to it. As opposed to that, if an ATD reuses a pre-existing asset, then only a one-way reference is created. This is described in more detail in the use case illustrated in FIGS. 6A-G. These figures are schematic in nature to illustrate the relationship between various assets. As such, they do not show some key properties that are otherwise critical for operation of the blockchain governance network. For instance, they do not show the property "description" that captures the details of a particular asset or the property LogEntry, or even the creator, approver, time-of-creation or status properties.

Preexisting Asset ATD

An ATD implies a set of work to be done to produce a data schema or a data distribution on one hand, or a variable, an execution code or a model on the other hand, by relying on a set of requirements and a set of sprints. Hence, all assets except an ATD get created as part of an ATD and must have a reference to the said ATD and vice versa. The Preexisting Asset ATD reflects pre-existing assets that must have reference to the corresponding ATDs when they get replicated at the time of deployment of our system at an organization or enterprise. As such, a preexisting asset ATD is created to act as reference for these pre-existing assets. This not only serves the design principal of each asset having a reference to an ATD, it also acts as a pre-existing asset catalog. It is worth noting that pre-existing asset ATDs can be numerous, as not all assets that are preexisting may enter onto the blockchain, or be utilized in the future. If they are a separate pre-existing asset, an ATD can be created for different set of assets being brought to future ATDs.

The preexisting Asset ATD is the first instance of a specific ATD asset created in the model governance network. As discussed herein, every deployable asset must originate in a Preexisting Asset ATD. An organization or enterprise using the model governance blockchain will often already have a few pre-existing deployables in place (say pre-existing variable sets that have successfully passed the governance process) when they begin to use the model governance blockchain solution. To bring these existing deployables on to the model governance blockchain, a preexisting asset ATD is created for the existing deployables anticipated to be used in later ATDs. A Preexisting Asset ATD can also reference too-often-used requirements from the past to give the system a head start. It also acts as a placeholder for pre-existing data schemas. The mechanism for importing all existing deployables is more fully described herein. FIG. 6A shows these relationships.

Requirements

In the context of ATD asset, requirements are what define the nature of the analytic project, as well as the deployable that is created due to the ATD. The business needs are translated into a set of analytic requirements. An asset called "requirement" is defined, capturing each atomic analytic requirement of the ATD. A requirement asset can be identified by a unique identifier and can include a timestamp to record the date and time of creation. It can also have a property description that captures the detailed description of what needs to be achieved as specified by the requirement in a human language. A requirement is directly created as part of an ATD but can be reused multiple times in subsequent ATDs. This relationship is recorded in the requirement asset, usually using a reference to the ATD that it is part of. Thus, an ATD can have a requirement that refers back to it, and an ATD can have pre-existing requirements that refer to other ATDs. FIG. 6B shows these relationships.

A requirement asset also captures the reference to the creator, usually a scientist or the analytic manager who may have originally defined the requirement. A property to record the current status of requirement is also made available, called status, which could take one of the multiple values defined using an enumeration. In some implementations, the various statuses that the requirement could be assigned include "CREATED", "MODIFIED", "APPROVED", and "SATISFIED." For instance, when a project owner approves a requirement, the status is set to "APPROVED". When a requirement is removed from an ATD, due to any reason, its status is changed to "DESCOPED" and its reference is removed from the requirements array in the ATD. Other statuses are possible and can be part of the enumeration defining the statuses of the requirements. As discussed earlier, each requirement asset also has an array of LogEntries. This tracks any transaction directly related to the requirement.

As an example, a new requirement can be created using a createRequirement transaction. The description property of the ATD would specify that the model must demonstrate a 30% improvement in VDR at a 10:1 false positive ratio. This requirement would then be added to the ATD. The LogEntry of both the requirement and the ATD assets would record this information.

A list of requirements is associated with sprints. These are the requirements that need to be satisfied and achieved as part of that sprint. Similarly, a list of requirements is associated with deployables or data distributions. These are the requirements that led to the creation of that deployable or generation of the data distribution. Often, creation of a deployable or data distribution ends up satisfying one or more requirements. Various illustrations in FIG. 6A-G demonstrate the schematic representation of a requirement and its relationship with the ATD, sprint, data distribution, data schema and various types of deployables.

Sprints

In the context of the ATD asset, sprints are what execute the analytic project that lead to translating the requirements into generation of data schema or data distributions or creation of one or more deployables. An ATD may have one or more sprints that collectively need to satisfy all the requirements associated with the ATD. A spring is an asset representing a subset of all the requirements of a particular ATD that needs to be completed, and a sprint asset is identified by a unique identifier and has a timestamp to record the date and time of creation. A sprint is directly associated with one and only one ATD. This relationship is recorded in the sprint asset, usually using a reference to the ATD that it is part of. Note that a sprint asset is unique in the sense that it only exists in the context of an ATD and hence must have a circular reference to the ATD that led to its creation, as shown in FIG. 6C.

A sprint asset also captures the reference to the creator, usually scientist(s) or the analytic manager who defined the sprint, along with the reference to the project owner, who has the authority to approve the sprint as successfully completed. The spring asset also has a reference to all the requirements that constitute the sprint as well as a reference to all the resources who are assigned to work on the sprint. These are usually defined as arrays of references to the requirements and development employees respectively, or alternatively as array of their identifiers. More significantly, a sprint has a start date and an end date. These are recorded as timestamps as properties of the sprint. Collectively these properties define and track the complete scope and history of execution of a sprint.

A property to record the current status of sprint is also made available, called status, which could take one of the multiple values defined using an enumeration. For instance, the various statuses to which the sprint can be assigned include "PLANNED", "STARTED", and "DELAYED." For instance, when a project owner approves a sprint, the status is set to "APPROVED." When a sprint is completed, its status is changed by the project owner to "COMPLETED." It should be appreciated that different roles have different statuses to be assigned. Other statuses are possible and can be part of the enumeration defining the statuses of the sprints. As discussed earlier, the sprint asset has an array of LogEntries. This tracks any transaction directly related to the sprint. A sprint can only be created in the context of an ATD. In that sense a sprint is unique from the rest of the assets which can be created outside of an ATD.

Data Schema

A data schema defines the layout of an input dataset. It can be identified by a unique identifier. This asset also has a description that describes in full detail the data elements and layout. The data schema is itself an outcome of an ATD to which it references. It also has an array of an abstract data structure called "data element". The data schema can also define the prescribed restrictions on the data. These restrictions are inherited by the data distribution assets based on the data schema, but can be overridden or modified as part of the data distribution.

A single "data element" has a name, a description (that defines the data element) and a data type. It also can have a set of restrictions on the values that the data element can legitimately take. In one implementation, an allowed minimum value and an allowed maximum value is specified in case of numerical data type. In alternate implementations, greater value ranges can be specified as a number of standard deviations are allowed. It also has a listing of special values that are allowed, as well as a meaning associated with the special values. Furthermore, it also has a transformation mapping for Nan and Inf, to indicate what values to replace when Nan and Inf are encountered respectively. It also has a transformation mapping for missing value imputation. The options may include: replace by zero; replace by mean; or drop record. In case of a categorical data type, it has a Boolean property which indicates whether or not it is ordinal. It also has a list of allowed values, and a flag to indicate whether this list can be expanded or not.

A data schema is a reusable asset. Once it is created, it can be referenced multiple times by various other ATDs, as well as data distribution assets. This is shown in FIG. 6A and FIG. 6D. It is critical for enforcing data governance and ensuring that the data violations pertaining to unexpected distributions do not happen. All deployables, whether a model, a variable or an execution code work on input data that are defined by the data schema, and as such they must reference a valid data schema. This is shown in FIGS. 6E and 6F.

Data Distribution

Each deployable is created using a dataset that conforms to a provided data schema asset. A data distribution asset captures the statistical distribution of this dataset. It is created as part of an ATD, and has a circular reference to this ATD. It also references the data schema that it is based on, and points to the location of a dataset that it represents and that is expected to conform to the specified data schema. If more than one dataset is provided as an array, then by convention the first one in the array is the training dataset, the second one is the test dataset. If there is a third entry, it is the validation dataset.

A data distribution is generated by a "development employee", usually a data analyst, to meet one or more requirements specified in the ATD. These requirements are often reusable requirements specifying various data validation requirements. But they can also be custom requirements specified in the context of the particular ATD.

Data distribution asset include an array of data elements. Each entry aligns with a corresponding entry in the data schema to which it refers. For each of the numerical data elements, it records a mean, a standard deviation and a range in terms of a mean and standard deviation, or alternatively a minimum and a maximum, and a variety of other statistics. It can also include a frequency count of cases going below allowed minimum and going above allowed maximum. It also records a frequency of Nan, Inf and missing values. For each of the categorical data element, it has a frequency table for each of the categorical values. If the list of allowed values is not expandable, then it also lists all values that violate this list along with the frequency counts.

This asset is the core asset for ensuring that the available data meets the constraints specified in the data schema. The data schema comes with prescribed restrictions on the data elements. These restrictions are inherited by the data distribution assets, but can be overridden or modified as part of working on an ATD. Often the initial restrictions specified by the data schema help understand the nature of deviation of the dataset used in the ATD, from the standard expectations around the data elements. It further allows for overriding or modifying these restrictions that are captured in the data distribution asset. The modified restrictions captured in the data distribution asset then act as a reference which must be adhered to in the production environment. Hence this asset goes through a rigorous approval cycle both by internal project owner, as well as the governance team and the external regulator. As such, it captures the approvers, their comments, and dates when approved. It also has a property for tracking its status as it goes through the process of generation by the data analyst, through various approval stages.

Deployables

Figure 7:
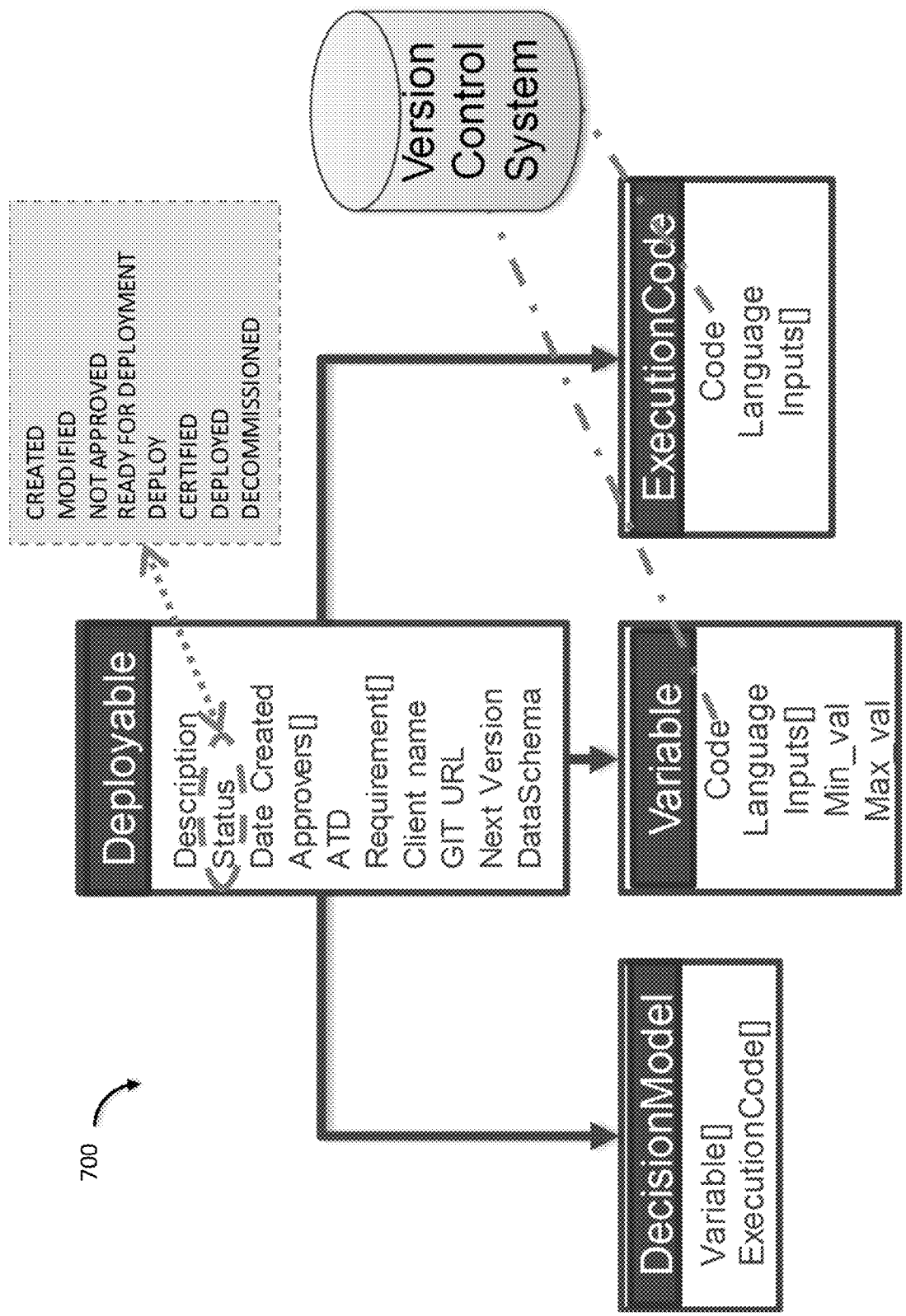
FIG. 7 shows an inheritance relationship between an abstract asset type Deployable and three types of assets that inherit from it in one particular implementation, in accordance with the disclosure herein.

A deployable is the physical asset that is an output of an ATD, and is used by enterprises or businesses for driving decisions. As such, this is the primary asset that the model development governance defines. A deployable itself cannot be instantiated. Three types of assets that inherit the properties of deployable can be defined. These assets are decision models, variables and execution codes. The inheritance relationship between deployable and these three types of assets is shown in FIG. 7. Deployable asset type carries a reference to the ATD asset and a reference to the list of requirements that led to its creation.

A deployable is identified using a unique identifier. The description property of this abstract asset captures details provided by the development team. Date of creation of the deployable is also recorded in the asset along with the reference of the creator(s) who created the instance of the deployable. This list can get often complicated by the fact that some deployables are often comprised of other deployables. For instance, a decision model can consist of variables, some of which would have creators who are distinct from the newly created variables. Since these linkages are maintained through references, it is fairly straightforward to see an itemized list of creators for each constituent component.

If there is a client for whom this deployable is being developed, this is captured in ClientName. In one implementation, a GITURL property captures the location in the version control system where the code is version controlled. Other implementations have equivalent properties for version control. This is done to ensure that the virtual asset being tracked by the deployable is always associated with a physical executable version of the deployable. To draw a parallel, a blockchain system may be used for buying and selling houses, but the virtual assets that are tracked on such a blockchain must have a physical equivalent that is actually bought and sold. As such, the actual model, execution code and variables can be maintained in a version control, and reference to it in the corresponding blockchain asset by way of GITURL or an equivalent property that uniquely ties the particular deployable asset to the executable version in the version control system.

A property to record the current state of the deployable, called status, is also made available, which could take one of the multiple values defined using an enumeration. For instance, the various statuses that the deployable could be assigned include "CREATED" and "MODIFIED". When a project owner approves a deployable, the status is set to "READY FOR DEPLOYMENT." When the model governance manager has provided their approval, the status is set to "DEPLOY." Some decision models need certification by external regulators before they can be deployed. If the needsCertification flag is true, then an external regulator needs to approve the model, changing its status to "CERTIFIED". When a deployable is deployed in production after all relevant approvals, its status is set to "DEPLOYED." Note that only a decision model can be deployed. When a deployable is decommissioned from the production environment, the status changes to "DECOMMISSIONED." A decommissioned variable or execution code cannot be used in a decision model. As discussed earlier, deployable asset also has an array of LogEntries. This tracks any transaction directly related to the deployable. Any changes that are made to the deployable get duly recorded in the LogEntries. Depending on the implementation, either the notes attribute captures the before and after scenarios, or if the implementation is explicit, then the attributes before and after capture the corresponding scenarios. These changes could include, by way of examples, adding or removing a variable to a model, making changes to the code, or changing the minimum or maximum allowable values for the variable in the production environment.

FIG. 7 illustrates an inheritance relationship 700 between abstract asset type deployable and the three types of assets that inherit from it, in one particular implementation. Solid arrows represent inheritance or parent-child relationship and dotted double-headed arrow represent an enumeration for the marked property of the asset. The "Code" references a version control system where the actual code sits. Variables and execution code also specify the language the code is written in and the inputs required. The variable captures minimum and maximum allowed values, and in additional to other specified statistical metrics. An enumeration of possible values that Status can take is also shown.

Version Control System

The physical code corresponding to a variable asset or an execution code asset is recorded and version-controlled in a version control system. In one implementation, where a GIT repository is used for version control of the code, a reference to the code's location in the version control system is recorded in the property "GITURL" or equivalent. This solution ensures that when the code in the version control system is updated, it invokes a remote transaction call in the blockchain governance to invoke an update transaction, which in turn updates the status as well as the version control location reference, e.g., GITURL. This transaction further emits an update event. This event is processed by the system to send a notification to the project owner of the change. If the project owner chooses to decline approval to this change, the corresponding transaction emits an event that is processed to revert the version in the version control system, as described in further detail herein.

Variable

A variable is a data transform of one or more data elements from the input data source or from other variables. For example, ratio variables are often computed based on other computed variables. The asset type variable represents a real variable created to meet one or more requirements of an ATD as an outcome of a sprint associated with the ATD. It extends a deployable and inherits all its properties that have been described herein. Apart from those properties, a variable asset also includes the code reference that captures the actual code, representing the logic behind the transformation of one or more data elements from the input data source to the variable. Any changes to any of these properties, including the reference to the code, is recorded in the LogEntries as well as in the LogEntries of the corresponding ATD. It also captures an array of inputs. The inputs can be data elements in the input dataset, or reference to other deployables, more specifically, variables, or both.

A variable is not directly deployed. It is always incorporated as part of a decision model, which is then deployed. The same variable can be used in multiple decision models. Only those variables whose status is either "DEPLOYED" or "CERTIFIED" can be used in a decision model. Since variables are reusable assets, a status of "DEPLOYED" or "CERTIFIED" represents that it has gone through the entire approval process prior to being utilized in an ATD. A "READY FOR DEPLOYMENT" variable can be used in a decision model, but the variable will have to go through approval process prior to the model being deployed.

Execution Code

The execution code asset type represents a piece of code that can be executed in deployment and which is created to meet one or more requirements of an ATD as an outcome of a sprint associated with the ATD. It extends the deployable and inherits all its properties that have been discussed earlier. As noted in the section titled "Deployable," a reference to a version control system is maintained where the actual code resides. Any changes to any of the properties, including the reference to the code, is recorded in the LogEntries, as well as in the LogEntries of the corresponding ATD. It also captures an array of inputs. The inputs can be data elements in the input dataset, or reference to other deployables, more specifically, variables, or both.

An execution code is not directly deployed. It is always incorporated as part of a decision model, which is then deployed. The same execution code can be used in multiple decision models. Only those execution codes can be used in a decision model whose status is either "DEPLOYED" or "CERTIFIED". Since an execution code is a reusable asset, a status of "DEPLOYED" or "CERTIFIED" implies that the code has gone through the entire approval process prior to being deployed for at least one ATD. A "READY FOR DEPLOYMENT" execution code can be used in a decision model but the execution code will have to go through approval process prior to the model being deployed.

Decision Model

The asset type decision model represents an actual decision model created to meet one or more requirements of an ATD as an outcome of a sprint associated with the ATD. It extends deployable and inherits all its properties that have been discussed earlier. Apart from these properties, a decision model has an array to reference a list of requirements. It also has a reference to a list of variables and execution codes. The reference variables and execution codes may get created as part of the same or another sprint associated with the ATD that leads to the creation of the decision model. These assets being used in a decision model could also be pre-existing variables and execution codes, arising out of a prior ATD. A model may require approval from the internal governance team for deployment, or it may even need approval from an external regulator, in which case its boolean flag needsCertification must be set to true.

Any changes to any of the properties, including the code, are recorded in the LogEntries, as well as in the LogEntries of the corresponding ATD.

Transactions

Transactions are a key to making a blockchain work. As shown in FIG. 2, they are the main entries in a shared ledger. Transactions change the state of the assets, creating a new instance of an asset, or modifying one or more properties of an existing instance of an asset. In the model governance framework, multiple types of transactions are defined, dealing with the various assets, i.e., ATD, requirement, sprint, variable, execution code and decision model. In the subsequent sections, examples are provided of some of the key transactions based on the primary asset types that they impact. Each transaction is defined in a manner such that when the transaction is executed, it records its invocation in all the corresponding assets that it impacts. This is done by appending the LogEntry of the impacted assets.

In some implementations, transactions are first defined as entities in their own right, and then corresponding code is defined for execution when the transaction is invoked. For instance, in Hyperledger Fabric, the logic to execute an instance of a particular transaction can be coded in JavaScript.

ATD Transactions

Many transactions associated with ATDs can be defined, and a few are presented below:

Create ATD: This transaction takes the description of the ATD and owner's reference, and creates an instance of an ATD. In one implementation, its identifier is automatically assigned, while in another it is supplied by a user. In one implementation, the user is automatically assigned as creator but there is also provision in some implementation to explicitly supply this information. While this can create an ATD without any requirements, in some implementation, at least one requirement can be generated at the same time as the creation of the ATD.

Duplicate ATD: This transaction takes reference to an existing ATD and creates a new ATD which has the same properties as the referenced ATD. In doing so, it also creates references to the requirements referenced in the original ATD. It also makes exact replicas of the sprints in the original ATD and points them to the newly created ATD. Often this is a fast way to create a new ATD with many of its attributes configured.

Add requirement: There are at least two main ways in which a requirement can be added to the ATD. In a first approach, reference to an existing requirement is taken and this reference is added to the requirements array in the ATD. In a second approach, when a new requirement has to be created, this transaction takes the details of the new requirement, and creates an instance of the new requirement with the provided details and assigns to the referenced ATD. This further makes an entry in the LogEntries of both the newly created requirement as well as the referenced ATD.

Add sprint: This transaction can take the details of a new sprint, and a list of existing requirements that are already part of the referenced ATD, to create an instance of a new sprint with the provided details, and assign it to the referenced ATD. Furthermore, it takes a list of scientists and assigns them on the sprint. Alternatively, for a requirement-by-requirement assignment, a key-value data structure can map a scientist to a requirement. If a scientist is mapped to more than one requirement, there are multiple entries, one corresponding to each requirement. If a requirement has more than one scientist assigned, there are again multiple entries, one corresponding to each scientist. It also sets the start and end date of the sprint and sets the status to "CREATED." It further makes an entry in the LogEntries of both the newly created sprint as well as the referenced ATD for tracking purposes.

Add data schema: This transaction can take the details of a new data schema, to create an instance of a new data schema with the provided details and assign it to the referenced ATD.

Update ATD: This transaction updates the details of the referenced ATD, and further makes an entry in the LogEntries of the referenced ATD. This can update the referenced requirements as well as sprints by calling further transactions to edit or delete them, as described in the following sections.

Approve ATD: Only those participants authorized to approve an ATD can successfully execute this transaction. The various processes for permissions is described in detail in the section titled "User access and access control." If ACL permits the user to invoke this transaction, then the transaction is invoked. Further, if the user is a development employee, more fin-grained permissions are programmatically controlled. In such a case, the transaction checks the role of the user, and if the development employee has the right role level, or if the user is marked as the project owner of the ATD, then the transaction approves the ATD. This further makes an entry in the LogEntries of the referenced ATD. In one implementation, approving an ATD successfully requires all the requirements assigned to the ATD to be already approved. In another implementation, approving an ATD successfully requires that all the assigned requirements are also automatically approved after confirming with the user. This further sets the status of the ATD to "APPROVED."

Each of the above transactions can have various different logic encoded depending on the specific needs of a particular business or enterprise. Furthermore, many other transactions to influence the ATD in variety of other ways can be implemented as required by a particular business or enterprise using the model governance blockchain. A timestamp is automatically extracted and relevant properties set with this timestamp, including the timestamp for the LogEntry.

Requirement Transactions

Creation of a requirement in the context of an ATD transaction has already been discussed. There are many types of transactions that are defined for working with an existing requirement. Some of the key ones are listed below:

Create requirement: When a new requirement has to be created, this transaction takes the details of the new requirement, and creates an instance of the new requirement with the provided details and assigns it to the referenced ATD. This further makes an entry in the LogEntries of both the newly created requirement as well as the referenced ATD.

Edit requirement: This transaction updates the details of the referenced requirement, and further makes an entry in the LogEntries of the referenced requirement and the corresponding ATD that the requirement belongs to. Further editing automatically puts the requirement in a non-approved state.

Approve requirement: This transaction first checks the employee role of the user, and if the employee has the right level, approves the requirement. More details about the permissions are provided in the section titled "User access and access control" as well as under "Approve ATD" transaction in the previous section. This further makes an entry in the LogEntries of the referenced requirement and the corresponding active ATDs that the requirement belongs to are marked not-approved. Lastly, this sets the status of the requirement to "APPROVED."

Delete requirement: This transaction changes the status of the referenced requirement to "DESCOPED." The requirement asset is not deleted from the requirement registry, but the status of the requirement is changed to "DESCOPED" and the ATD is marked not-approved. This transaction also makes an entry in the LogEntries of the referenced requirement and the corresponding ATD that the requirement belonged to, to reflect this changes. The requirement could be reused in a subsequent ATD.

Each of these transactions can have various different logic encoded depending on the specific needs of a particular business or enterprise. Furthermore, many other transactions can be defined to influence the requirement in variety of ways as required by a particular business or enterprise using the model governance blockchain. Further still, each transaction makes an entry in the LogEntries of the corresponding requirement as well as the corresponding ATD. A timestamp is automatically extracted and relevant properties set with this timestamp, including the timestamp for the LogEntry.

Sprint Transactions

Creation of a sprint in the context of an ATD transaction has already been described. There are many types of transactions that are defined for working with an existing sprint. Some of them are listed below:

Create sprint: This transaction takes reference of an ATD, the details of a new sprint, and a list of existing requirements that are already part of the referenced ATD, to create an instance of a new sprint with the provided details and assigns it to the referenced ATD. Furthermore, it takes a list of scientists and assigns them on the sprint. Alternatively, for a requirement by requirement assignment, a key-value data structure can map a scientist to a requirement. If a scientist is mapped to more than one requirement, there are multiple entries, one corresponding to each requirement. If a requirement has more than one scientist assigned, there are again multiple entries, one corresponding to each scientist. It also sets the start and end date of the sprint and sets the status to "CREATED." It further makes an entry in the LogEntries of both the newly created sprint as well as the referenced ATD for tracking purposes. A sprint can only be created in the context of an ATD. In that sense a sprint is unique from the rest of the assets which can be created outside of an ATD also.

Edit sprint: This transaction updates the details of the referenced sprint. This further makes an entry in the LogEntries of the referenced sprint and the corresponding ATD to which the sprint belongs.

Complete sprint: This transaction first checks the employee role of the user, and if the employee has the right level, marks the sprint as completed. A sprint must be "COMPLETED" before it can be "APPROVED." This further makes an entry in the LogEntries of the referenced sprint and the corresponding ATD to which the sprint belongs.

Approve sprint: This transaction first checks the employee role of the user, and if the employee has the right level, then checks whether its status is "COMPLETED" and then approves the sprint. It sets the status of the sprint to "APPROVED." More details about the permissions are provided in the section titled "User access and access control" as well as under "Approve ATD" transaction in the previous section. If any of the requirements associated with the sprint are not yet approved at this point, this will also approve those requirements. This further makes an entry in the LogEntries of the referenced sprint and the corresponding ATD to which the sprint belongs. If any requirement is approved, their corresponding LogEntries are also updated.

Add requirement: This transactions adds a new requirement to the list of requirements that are part of the referenced sprint.

Remove requirement: This transaction takes reference to a requirement that is already part of the referenced sprint and removes it from the list.

Move requirement: This transaction takes a reference to a requirement in a specific sprint, removes it from that sprint, and then adds it to the specified target sprint.

Add scientist: This transaction takes reference to a scientist and add this scientist to the list of scientists that are part of the referenced sprint.

Remove scientist: This transaction takes reference to a scientist that is already part of the referenced sprint and removes them from the list.

Some of these transactions can be stitched together to perform a variety of additional tasks. For example, moving a requirement from one sprint to the next sprint can be achieved by invoking the "remove requirement" and "add requirement" with a proper set of references for the "from" and "to" sprints. This process can be done in one implementation using the graphical user interface of the application that sits on the top of the blockchain. This application is more fully described in the section titled "application for accessing model governance blockchain."

Each of these transactions can have various different logic encoded depending on the specific needs of a particular business or enterprise. Furthermore, many other transactions can be defined as required by a particular business or enterprise using the model governance blockchain. A timestamp is automatically extracted and relevant properties set with this timestamp, including the timestamp for the LogEntry. Furthermore, each of the transactions make an entry in the LogEntries of the sprint as well as the corresponding ATD.

Data Schema Transactions

Each deployable requires reference to a data schema, which may be a pre-existing data schema or which may get created as part of an ATD and a list of requirements that the creation of that data schema would satisfy. A timestamp is automatically extracted and relevant properties set with this timestamp, e.g., date of creation, as well as the timestamp for the LogEntry. Generally, the data schema is focused on elements utilized by the analytic model/deliverable, definition of allowable values or ranges, and can be used across a variety of ATDs.

Create data schema: This transaction takes details of a data schema and create a new data schema. It references the ATD as well as the requirements that led to its creation. It then generates an entry in the LogEntries of the newly created data schema as well as the corresponding ATD.

Copy data schema: This transaction takes reference of an existing data schema and generates a new data schema with exact same properties. It then changes the status of the data schema to "CREATED" and sets the current user as the creator. It also records the timestamp and makes a log entry reflecting the fact that it is a replica of the referenced data schema.

Add data element: This transaction takes reference of an existing data schema, and details of a data element and adds the details of the data element to the data schema. It then changes the status of the data schema to "EDITED."

Remove data element: This transaction takes reference to a data schema and a data element, and removes the data element. It then changes the status of the data schema to "EDITED."

Add restrictions: This transaction takes reference of an existing data schema, and a data element in the data schema, and applies the provided restrictions to the data element. The transaction first validates that the supplied restrictions are relevant for the data element and if so, updates the data schema to reflect those supplied restrictions. It then changes the status of the data schema to "EDITED."

Modify restrictions: This transaction takes reference of an existing data schema, and a data element in the data schema and applies the provided restrictions to the data element. The transaction first validates that the supplied restrictions are relevant for the data element and if so, updates the data schema to reflect those supplied restrictions. It then changes the status of the data schema to "EDITED."

Each of these transactions can have various different logic encoded depending on the specific needs of a particular business or enterprise. Furthermore, many other transactions can be defined to influence the requirement in variety of ways as required by a particular business or enterprise using the model governance blockchain. Usually, a data schema must be "APPROVED" before being used. Furthermore, each transaction generates an entry in the LogEntries of the requirement as well as the corresponding ATD. A timestamp is automatically extracted and relevant properties set with this timestamp, including the timestamp for the LogEntry.

Data Distribution Transactions

Each deployable is built on top of a data set that must conform to a data schema. As such it requires reference to a data schema. A timestamp is automatically extracted and relevant properties set with this timestamp, e.g., date of creation, as well as the timestamp for the LogEntry.

Create data distribution: This transaction takes details of a dataset and a data schema and creates a new data distribution. This data distribution has all its data elements derived from the data schema but none of these are populated with statistics. It references the ATD, and then makes an entry in the LogEntries of the newly created data schema as well as the corresponding ATD.

Populate stats: This transaction takes reference of an existing data distribution and statistical distributions of the data elements in a JSON format and populates the stats of each data element. The blockchain governance solution has interfaces which can consume the statistics in a variety of formats, including CSV and Excel, and parses the information in the required JSON format before invoking the transaction. It also records the timestamp and makes a log entry reflecting the fact that it is a replica of the referenced data schema.

Update stats: This transaction takes reference of an existing data distribution, a data element and supplied stats of that data element, and updates the data distribution. It then changes the status of the data distribution to "EDITED." It also records the timestamp and makes a log entry.

Modify restrictions: This transaction takes reference of an existing data distribution, and a data element and applies the provided restrictions to the data element. The transaction first validates that the supplied restrictions are relevant for the data element and if so, updates the data distribution to reflect those supplied restrictions. It then changes the status of the data element to "EDITED." Usually a data distribution must be "APPROVED" before being deployed.

Deployable Transactions

Since three different types of assets are derived from the abstract asset called "deployable," three different types of transactions are defined under this category. Each of them take a reference to the ATD and a list of requirements that the creation of that deployable would satisfy. Apart from that, these transactions include a reference to a version control system location where the code base exists, and is version controlled such that any change to the blockchain associated with code is automatically pushing commits to the repository. In one implementation, a GIT repository can be used as the version control system. There is also a description associated with these transactions to describe the asset being created. A timestamp is automatically extracted and relevant properties set with this timestamp, e.g., date of creation, automatic code commit into version control, as well as the timestamp for the LogEntry. Each of these "create" transactions then make an entry in the LogEntries of the asset as well as the corresponding ATD.

Figure 8:
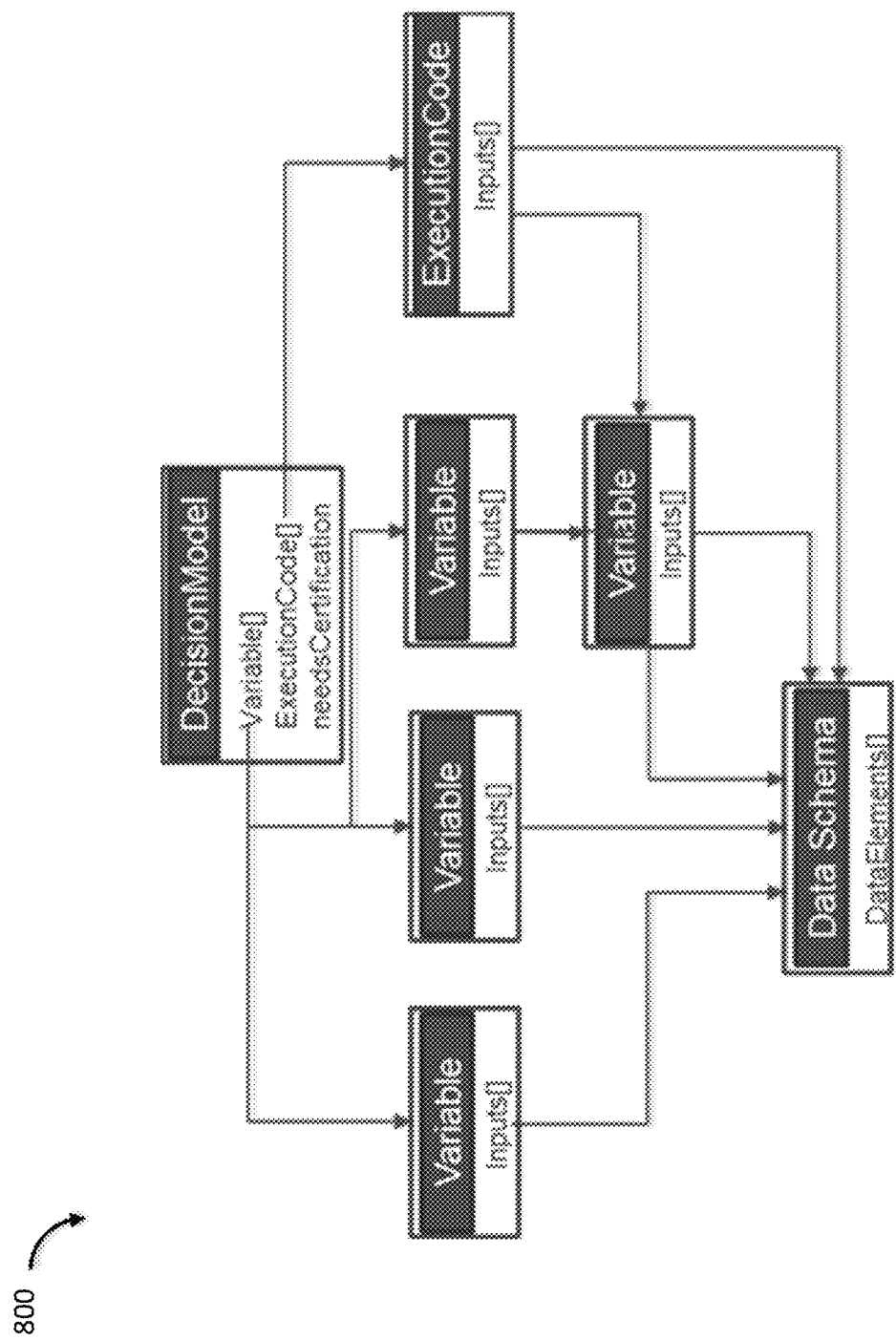
FIG. 8 shows relationships between various types of deployables and their dependence on DataSchema asset.

FIG. 8 shows a diagram 800 of relationships between various types of deployables. A decision model consists of one or more variables and execution codes. Variables and execution codes can be directly based on the data elements in the data schema, or they could be derived on other variables. FIG. 8. shows a decision model that includes one or more variables and execution codes. Variables and execution codes can be directly based on the data elements in the data schema, or they could be derived on other variables. Following are the relevant "create" transactions related to deployables:

Create variable: Apart from the information described above, this transaction also takes the details of the code as "code" reference discussed earlier, and shown in FIG. 7. It then creates an instance of variable asset with specified properties. If a data schema is provided, it records the reference of the data schema.

Create execution code: Apart from the information described above, this transaction also takes the details of the execution code as "code" reference discussed earlier, and shown in FIG. 7. It then creates an instance of the execution code asset with specified properties. The code is responsible for the model workflow upon receipt of data, state management, variable computations, and model execution. If a data schema is provided, it records the reference of the data schema.

Create decision model: Apart from the information described above, this transaction takes reference to a list of pre-existing variables and a list of pre-existing execution codes. There needs to be a valid reference to at least one pre-existing variable or one pre-existing execution code. A valid pre-existing variable or execution code is the one whose status is either "DEPLOYED" or "CERTIFIED." It then creates an instance of a decision model asset with specified properties. If a data schema is provided, it records the reference of the data schema.

Decision Model Transactions

The creation of a decision model in the context of deployable transactions has been discussed. There are many types of transactions that are defined for working with an existing model. Each of these transactions make an entry in the LogEntries of the decision model as well as the corresponding ATD. Some of these transactions are listed below:

Add variable: This takes a reference to an existing variable and adds it to the referenced decision model. The status of the variable must be either "DEPLOYED" or "CERTIFIED."

Add execution code: This takes a reference to an existing execution code and adds it to the referenced decision model. The status of the variable must be either "DEPLOYED" or "CERTIFIED."

Add data schema: This takes a reference to an existing data schema and adds it to the referenced decision model. The status of the data schema must be either "DEPLOYED" or "CERTIFIED."

Remove variable: This takes a reference to an existing variable and removes it from the referenced decision model. If the variable is not part of the referenced decision model, appropriate information is provided and no further action is taken.

Remove execution code: This takes a reference to an existing execution code and removes it from the referenced decision model. If the variable is not part of the referenced decision model, appropriate information is provided and no further action is taken.

Change execution code: This takes a reference to a change in execution code that is tracked in the associated version control system using the location reference, such as a GITURL, for example.

Ready for deployment: Once the model development is over, the project owner can approve the model and change its status to "READY FOR DEPLOYMENT". The transaction determines the current state and permissions of the individual invoking the transaction to determine whether this change can be made.

Approve model: Once the model is set to "READY FOR DEPLOYMENT," a model governance manager can approve it for deployment and change it status to "DEPLOY." The transaction determines the current state and permissions of the individual invoking the transaction to determine whether this change can be made.

Certify model: Once the model is set to "DEPLOY," an external regulator can approve it for deployment and change it status to "CERTIFIED." The transaction determines the current state and permissions of the individual invoking the transaction to determine whether this change can be made. This is required before deployment if the model's boolean flag needsCertification is set to true.

Reject model: Once the model development is over, an approver can reject the model. This would invalidate and reject the ATD as completed/approved, and one or more requirements within the last sprint are not approved to be addressed by the scientists. The type of participant is recorded, for instance, whether the approver is a project owner (i.e., development employee), governance manager, or external regulator.

Deploy model: This transaction looks at the approval status, and permissions of the user. If the model is "CERTIFIED," or its boolean flag needsCertification is set to false and status is "DEPLOY" and the user has the right privileges, the model can be deployed and its status changed to "DEPLOYED" with additional deployment notes.

Decommission model: This transaction takes a reference to an existing model to decommission, and if the permission level of the individual invoking the transaction is appropriate, it sets the status to "DECOMMISSIONED" with additional decommissioning notes. Furthermore, it may take reference to another decision model, sets the "next version" to point to this decision model, and deploys this decision model. If the deployment fails, the entire decommission transaction is rolled back.

The processes of add and remove transactions are done in one implementation using the graphical user interface of the application that sits on the top of the blockchain. This allows for viewing candidate variables and execution codes for addition or removal and the user can then select one of them to be added or removed as the case may be. Similarly, for decommissioning a model, a list of candidates are displayed by the application to choose as the next version, if available. This application is more fully described in the section titled "application for accessing model governance blockchain."

Variable Transactions

Creation of a variable in the context of deployable transactions has been described. There are many types of transactions that are defined for working with an existing variable. Each of these transactions make an entry in the LogEntries of the variable as well as the corresponding ATD. A timestamp is automatically extracted and relevant properties set with this timestamp, including the timestamp for the LogEntry. Some of these transactions are listed below:

Edit variable: This takes a reference to an existing variable and makes the supplied changes. This could include a change in the description, or a change in the code reference. If there is a change in the code reference and a version control system is used for code versioning, then the process described in the section "Code" is executed for automatically synching the code changes.

Copy variable: This takes a reference to an existing variable and makes a new variable asset with identical properties. The code is also automatically created in the version control system.

Update stats: This transaction takes reference of a variable, and supplied stats of that variable, and updates the ranges, min_val, max_val and other specified statistics. It then changes the status of the data distribution to "EDITED." It also records the timestamp and makes a log entry reflecting the fact that it updated the stats.

Ready for deployment: Once the variable creation is over, the project owner can approve the variable and change its status to "READY FOR DEPLOYMENT." The transaction determines the current state and permissions of the individual invoking the transaction to determine whether this change can be made.

Approve variable: Once the variable is set to "READY FOR DEPLOYMENT," a governance manager can approve it for deployment and change its status to "DEPLOY." The transaction determines the current state and permissions of the individual invoking the transaction to determine whether this change can be made.

Certify variable: Once the variable is set to "DEPLOY", an external regulator can approve it for deployment and change it status to "CERTIFIED". Often this is done as part of the model certification. The transaction determines the current state and permissions of the individual invoking the transaction to determine whether this change can be made.

Reject variable: Once the variable creation is over, an approver can reject the variable, this would invalidate and reject the ATD as completed/approved and one or more requirements within the last sprint are not approved to be addressed by the scientists. The type of participant is recorded, for instance, whether the approver is a project owner (i.e., development employee), governance manager, or external regulator.

Decommission variable: This transaction takes a reference to an existing variable to decommission and if the permission level of the individual invoking the transaction is appropriate, it sets the status to "DECOMMISSIONED" with additional decommissioning notes. Furthermore, it may take reference to another decision variable, sets the "next version" to point to this variable. Note "Decommissioned" means the variable is not to be used in the future for any subsequent ATDs, and sprints. When the variable can be used in future models, but has to be removed from the next build of a model, then a "Remove variable" transaction discussed in the context of model transactions should be used.

Each of these transactions can have various different logic encoded depending on the specific needs of a particular business or enterprise. Furthermore, many other transactions to influence the variables in variety of other ways can be implemented as required by a particular business or enterprise using the model governance blockchain.

Execution Code Transactions

Creation of an execution code in the context of deployable transactions has already been discussed. There are many types of transactions that are defined for working with an existing execution code. Some of these transactions are listed below:

Edit execution code: This takes a reference to an existing execution code and makes any supplied changes. This could include changes in the description, or changes in the code reference. If there is a change in the code reference and a version control system is used for code versioning, then the process described in the section "Code" is executed for automatically synchronizing the code changes.

Copy execution code: This takes a reference to an existing execution code and makes a new execution code asset with identical properties. The code is also automatically created in the version control system.

Ready for deployment: Once the execution code creation is over, the project owner can approve the execution code and change its status to "READY FOR DEPLOYMENT." The transaction determines the current state and permissions of the individual invoking the transaction to determine whether this change can be made.

Approve execution code: Once the execution code is set to "READY FOR DEPLOYMENT," a governance manager can approve it for deployment and change its status to "DEPLOY." The transaction determines the current state and permissions of the individual invoking the transaction to determine whether this change can be made.

Certify execution code: Once the execution code is set to "DEPLOY," an external regulator can approve it for deployment and change its status to "CERTIFIED". Often this is done as part of the model certification. The transaction determines the current state and permissions of the individual invoking the transaction to determine whether this change can be made.

Reject execution code: Once the execution code creation is over, an approver can reject the execution code, and this would invalidate and reject the ATD as completed/approved and one or more requirements within the last sprint are not approved to be addressed by the scientists. The type of participant is recorded, for instance, whether the approver is a project owner (i.e., development employee), governance manager, or external regulator. This could come from a testing function (quality assurance) or code review by a sprint approver.

Decommission execution code: This transaction takes a reference to an existing execution code to decommission, and if the employee role of the user invoking the transaction is appropriate, it sets the status to "DECOMMISSIONED" with additional decommissioning notes. This status indicates that the execution code is not approved for use any longer and as such is in an unused state. Generally it would also mean it was not allowable to be used in any future sprint/ATD. Note that when the code can be used in future models, but has to be removed from the next build of a model, then a "Remove execution code" transaction discussed in the context of model transactions should be used.

Each of these transactions can have various different logic encoded depending on the specific needs of a particular business or enterprise. Furthermore, many other transactions to influence the execution codes in a variety of other ways can be implemented as required by a particular business or enterprise using the model governance blockchain. Each of these transactions make an entry in the LogEntries of the execution code as well as the corresponding ATD. A timestamp is automatically extracted and relevant properties set with this timestamp, including the timestamp for the LogEntry.

Importing Existing Deployables

When an enterprise starts using the model governance blockchain, it may often already have a few deployables in place. Every deployable asset must originate due to an ATD. In order to bring these existing deployables on to the model governance blockchain, a Preexisting Asset ATD is created as a catch-all for all the existing deployables. To import the existing deployables, especially those that are expected to be used in future development and deployment, instances of those deployables are created using the relevant transactions. In one implementation, an instantiation script is configured with the relevant invocation of the transactions along with relevant properties to create instances of these assets. In another implementation, a user manually invokes each of the relevant transactions for each of the existing deployables to bring them into the model governance blockchain.

Events

Events are semaphores that can be emitted to broadcast that a transaction has taken place. A number of events are defined to which the application sitting on top of the blockchain, as well as other interested parties, can subscribe. In such a case, if an event is emitted by a transaction, the listening parties can take appropriate action. A sample of events defined for the model governance blockchain are described below.

Create ATD Event: This event is emitted when a "Create ATD" transaction successfully executes. In such a case, the application is configured to send out an email to the project owner notifying that an ATD has been created. Other types of actions can also be defined to be executed up on emitting of this event.

Complete Sprint Event: This event is emitted when a "Complete Sprint" transaction successfully executes. In such a case, the application is configured to send out an email to the project owner notifying that a Sprint has been completed, so that they can meet with the team to review and approve the sprint. Other types of actions can also be defined to be executed up on emitting of this event.

Ready To Deploy Model Event: This event is emitted when a "Ready to Deploy Model" transaction successfully executes. In such a case, the application is configured to send out an email to the model governance team. Other types of actions can also be defined to be executed up on emitting of this event.

Edit variable Event: This event is emitted when a "Edit variable" transaction successfully executes. This event forms the backbone to synchronize the code between the blockchain governance solution and an external version control system as described herein.

Each of these events can be emitted under various scenarios upon invocation of different transactions depending on the specific needs of a particular enterprise. Furthermore, many other events to automate aspects of communication in the context of model governance can be implemented in variety of other ways as required by a particular enterprise.

Queries

Various different ways in which the life cycle of an ATD is tracked leading up to deployment of a model have been described. Furthermore, as shown in FIG. 6, various assets have direct reference to other assets. For example, an ATD refers to a list of decision models and a decision model refers to the ATD that led to its creation. Using this reference mechanism, which ATD led to creation of a decision model can be identified, or which variables are part of a decision model. Queries to provide specific information can also be defined. Some of them are listed below:

Assigned Sprints: For a given scientist, identify all the sprints that they are assigned to, along with the start and end dates of the sprints.

Live ATDs: For a given project owner return all the currently live ATDs. If no owner is specified then return all the currently live ATDs. A live ATD is one whose status is currently not APPROVED.

Delayed Sprints: Identify all sprints that are currently DELAYED.

Most Tardy Manager: Identify the project manager who has most number of DELAYED sprints.

ATD History: For a given ATD, identify all the transactions that have taken place.

Unsatisfied Requirements of Sprint: For a given sprint, list out all the requirements that are still not SATISFIED.

Unapproved Variables of Sprint: For a given sprint, which variables are not yet READY TO DEPLOY.

Show Backlog: For a given ATD, provides a Backlog, which is the number of requirements still not SATISFIED.

Variables Approved By Hierarchy: Show all variables approved by any development employee at a particular hierarchy level. For instance, show all variables approved by any director level employee.

Variable dependency: List all data elements of a given variable.

Model dependency: List all the variables, data elements, and then the values and other statistics of a given model.

Approval status of variables in model: For a given model, list all variables, and for each variable describe their status.

Many other queries can be implemented. The implementation is done using the support provided by the underlying blockchain infrastructure. Just like transactions, queries are also exposed through the application, which is more fully described below.

Application for Accessing Model Governance Blockchain

Figure 9:
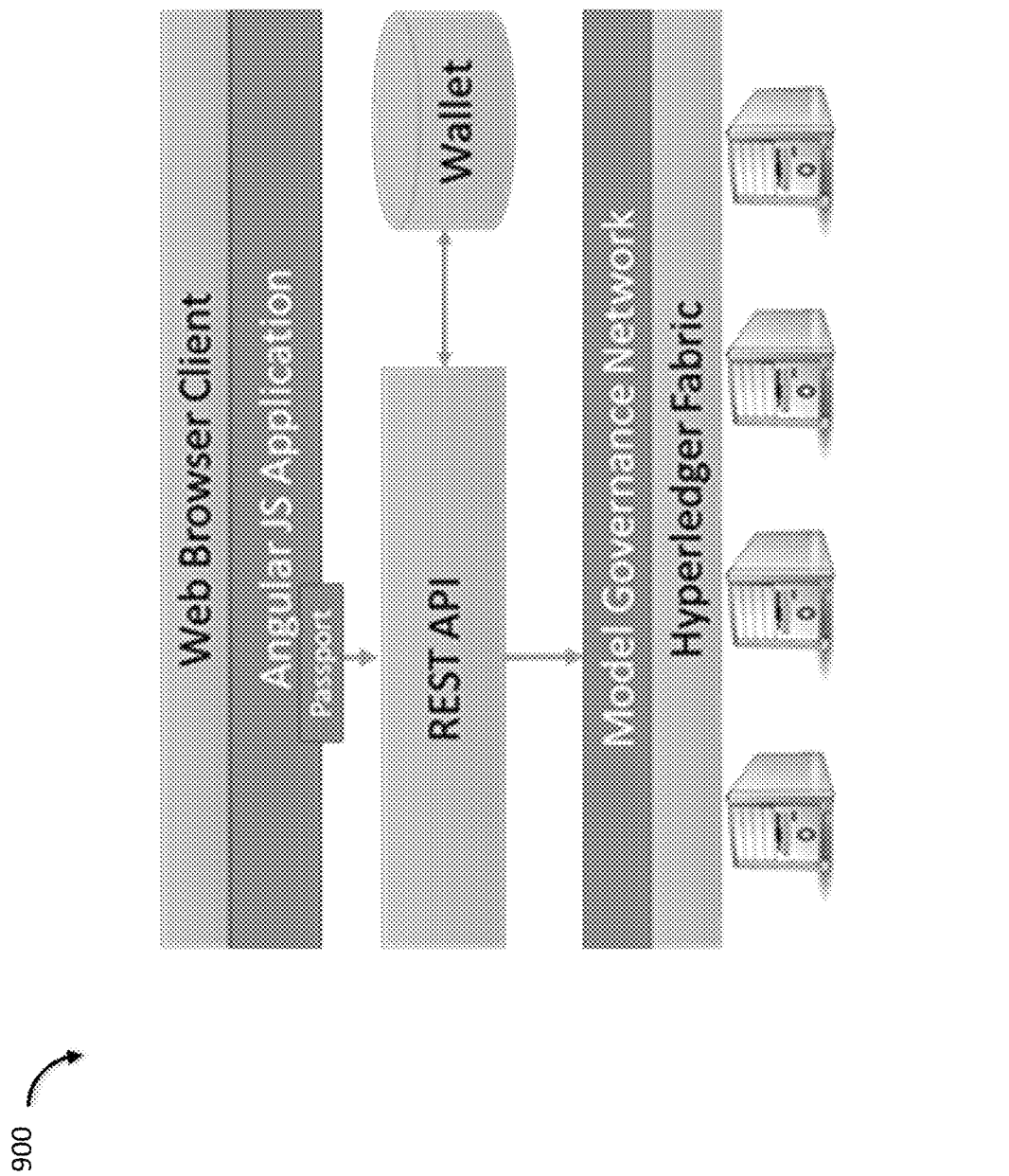
FIG. 9 is a high level architectural diagram of an implementation of a model governance blockchain application.

Functionalities of the underlying blockchain infrastructure are leveraged to expose the participants, assets, transactions and queries to an external application. For instance, in one implementation, using the Hyperledger fabric, the model governance blockchain is exposed as a REST API using the Loopback framework. An Angular JS application allows access to the REST API using a graphical user interface. A REST API may also connect to a wallet for identity management and multi-user access. It is configured to use an open source library such as Passport to authenticate itself with the REST API. A web browser is used as a client for accessing the application. FIG. 9 shows a high level architectural diagram 900 of the overall implementation of the model governance blockchain application on Hyperledger Fabric. It also shows the relationship of a passport and a wallet with the rest of the application. Those of skill in the art would recognize that other blockchain infrastructures and support applications could also be used.

A graphical user interface of the application that sits on top of the model governance blockchain provides access to all the ATDs. For a chosen ATD, the application provides access to all the corresponding requirements, sprints, models, variables and execution codes. Invocation of various transactions are made easy and intuitive using this interface. For instance, in one implementation, moving a requirement from one sprint to the next sprint of an ATD is achieved directly by "move requirement" or by successively invoking the "remove requirement" and "add requirement" with a correct set of references for the "from" and "to" sprints. Similarly, to add an existing variable to a model, a list of candidate variables, which are either "CERTIFIED" or "DEPLOYED," is displayed to select from. The LogEntries are shown as a way to scroll through the history of a selected asset that is displayed. Queries provide the necessary information to present relevant additional information to the user.

Interfacing with External Systems

Figure 10:
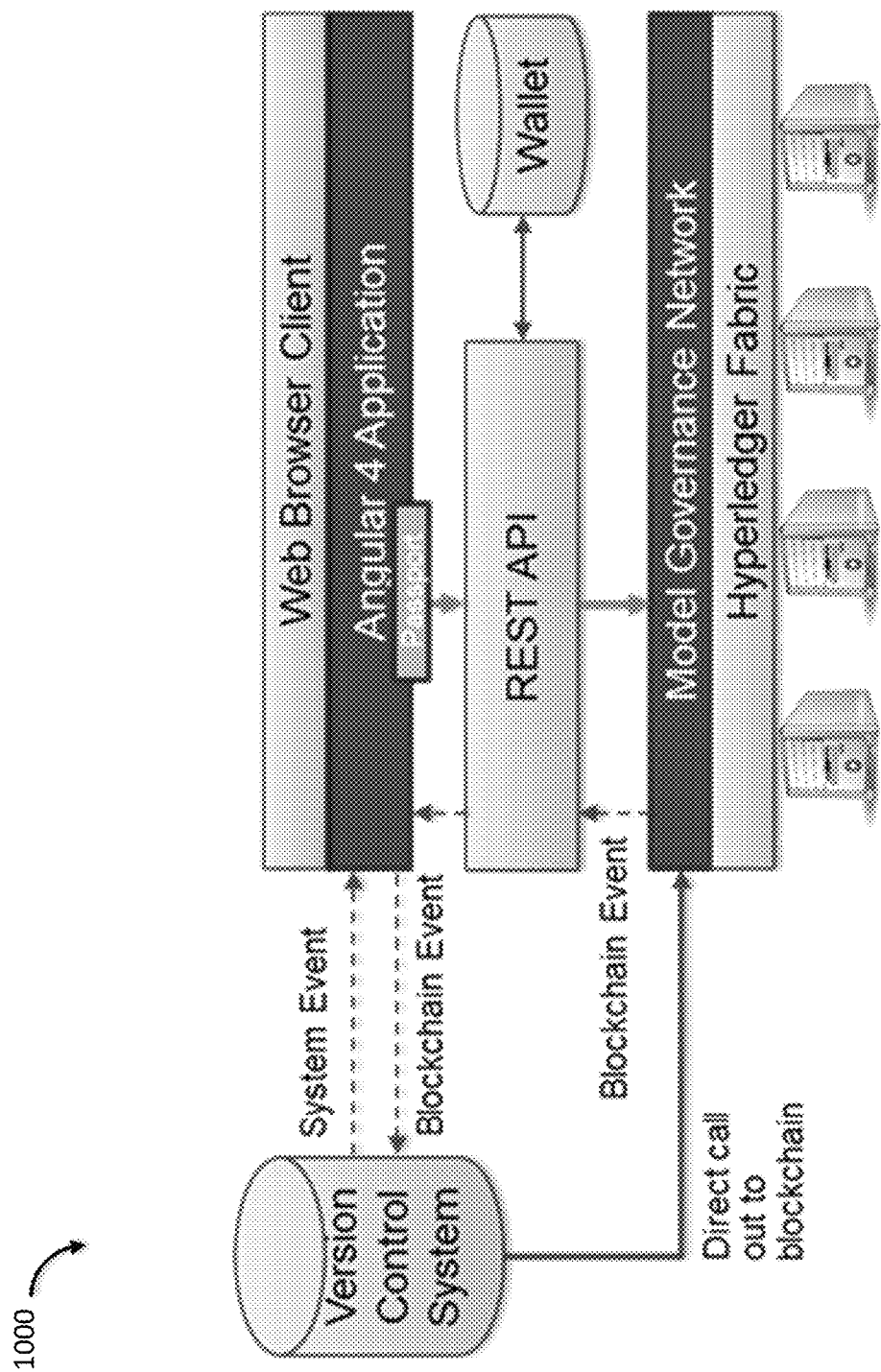
FIG. 10 is a block diagram schematic of mechanisms by which the present solution integrates with external systems.

The blockchain solution is designed to work on the concept of events and direct callouts to integrate with existing systems. The blockchain emits certain types of events when certain transactions are executed, as described herein. Similarly, the system "listens" for any event generated by external systems. External systems can also make a direct call to the blockchain, though the event approach is always a recommended approach from modularity and design principle perspective. For example, when the code in the version control system is updated, it sends out a system event notification that is captured by the present solution. The system in turn invokes a transaction call in the blockchain governance to invoke an update transaction, which updates the status as well as the version control location reference, e.g., GITURL. This transaction further emits an update event, and this event is processed by our solution to send a notification to the project owner of the change. If the project owner chooses to decline approval of this change, the corresponding transaction emits an event that is processed to revert the version in the version control system. FIG. 10 shows the schematic 1000 of the mechanisms by which the present solution integrates with external systems like version control systems.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for developing and deploying analytic and machine learning models for decision-making in a process, the method comprising:
constructing one or more data structures including an analytic model making one or more decisions, the analytic model defined based on input data, one or more of a statistical algorithm and a machine-learning algorithm, and expert knowledge data used in the development of the analytic model;
storing, in a blockchain, at least one analytic tracking document (ATD) defining the input data, the one or more of the statistical algorithm and the machine-learning algorithm, and the expert knowledge data;
tracking an approval chain associated with the analytic and machine learning models defined in the at least one analytic tracking document (ATD); and
storing, in the blockchain, one or more of data schema, data statistics, variables, characteristics, execution code, and analytic and machine learning model assets and associated approval chains,
the blockchain including one or more blocks that are cryptographically hashed to a previous block in the blockchain, and the blockchain recording and tracking a provenance of the analytic decision model for execution by a decision computing system.

2. The method in accordance with claim 1, wherein the defining includes requirements, sprints, data, models, variables and execution codes of the analytic model.

3. The method in accordance with claim 1, wherein each of the one or more blocks of the blockchain comprises a timestamp and transaction data related to at least a portion of the at least one ATD.

4. The method in accordance with claim 1, further comprising storing, by the one or more data processors, the one or more blocks of the blockchain and associated code assets in a version control code database.

5. The method in accordance with claim 1, wherein a block representing the at least one ATD represents a state in a lifecycle of an analytic module comprising one or more of requirements, sprints, models, variables, and execution codes.

6. The method in accordance with claim 1, wherein each requirement, data source, variable, execution code, and model associated with the at least one ATD in the blockchain is associated with one or more required approvers.

7. The method in accordance with claim 1, wherein the model development and deployment blockchain can be queried to document formal approvals and timestamps of the approvers in the block chain associated with the data source, variable, execution code, and model for use in model governance, validation, and regulatory processes.

8. A non-transitory computer program product storing instructions that, when executed by at least one programmable processor, cause at least one programmable processor to perform operations comprising:
defining an analytic model for making one or more decisions, the analytic model being defined by input data, one or more of a statistical and a machine-learning algorithm, and expert knowledge in the development of the analytic model, the input data, the one or more of the statistical and the machine-learning algorithm, and the expert knowledge defined in at least one analytic tracking document (ATD);
tracking an approval chain by developers, managers, validators, model governance, and regulators associated with the analytic and machine learning models defined in at least one analytic tracking document (ATD); and
storing data schema, data statistics, variable/characteristics, execution code, and analytic and machine learning model assets and associated approval chains in a blockchain, the storing comprising storing the at least one ATD in one or more blocks of the blockchain, each of the one or more blocks being cryptographically hashed to a previous block in the blockchain, the blockchain recording and tracking a provenance of the analytic decision model for execution by a decision computing system.

9. The computer program product in accordance with claim 8, wherein the defining includes requirements, sprints, data, models, variables and execution codes of the analytic model.

10. The computer program product in accordance with claim 8, wherein each of the one or more blocks of the blockchain comprises a timestamp and transaction data related to at least a portion of the at least one ATD.

11. The computer program product in accordance with claim 8, further comprising storing, by the one or more data processors, the one or more blocks of the blockchain and associated code assets in a version control code database.

12. The computer program product in accordance with claim 8, wherein a block representing the at least one ATD represents a state in a lifecycle of an analytic module comprising one or more of requirements, sprints, models, variables, and execution codes.

13. The computer program product in accordance with claim 8, wherein each requirement, data source, variable, execution code, and model associated with the at least one ATD in the blockchain is associated with one or more required approvers.

14. The computer program product in accordance with claim 8, wherein the model development and deployment blockchain can be queried to document formal approvals and timestamps of the approvers in the block chain associated with the data source, variable, execution code, and model for use in model governance, validation, and regulatory processes.

15. A system comprising:
at least one programmable processor; and
a machine-readable medium storing instructions that, when executed by the at least one processor, cause the at least one programmable processor to perform operations comprising:
defining an analytic model for making one or more decisions, the analytic model being defined by input data, one or more of a statistical and a machine-learning algorithm, and expert knowledge in the development of the analytic model, the input data, the one or more of the statistical and the machine-learning algorithm, and the expert knowledge defined in at least one analytic tracking document (ATD);
tracking an approval chain by developers, managers, validators, model governance, and regulators associated with the analytic and machine learning models defined in at least one analytic tracking document (ATD); and
storing data schema, data statistics, variable/characteristics, execution code, and analytic and machine learning model assets and associated approval chains in a blockchain, the storing comprising storing the at least one ATD in one or more blocks of the blockchain, each of the one or more blocks being cryptographically hashed to a previous block in the blockchain, the blockchain recording and tracking a provenance of the analytic decision model for execution by a decision computing system.

16. The system in accordance with claim 15, wherein the defining includes requirements, sprints, data, models, variables and execution codes of the analytic model.

17. The system in accordance with claim 15, wherein each of the one or more blocks of the blockchain comprises a timestamp and transaction data related to at least a portion of the at least one ATD.

18. The system in accordance with claim 15, further comprising storing, by the one or more data processors, the one or more blocks of the blockchain and associated code assets in a version control code database.

19. The system in accordance with claim 15, wherein a block representing the at least one ATD represents a state in a lifecycle of an analytic module comprising one or more of requirements, sprints, models, variables, and execution codes.

20. The system in accordance with claim 15, wherein each requirement, data source, variable, execution code, and model associated with the at least one ATD in the blockchain is associated with one or more required approvers.

* * * * *